(12) United States Patent
Willows et al.

(10) Patent No.: US 11,921,310 B2
(45) Date of Patent: Mar. 5, 2024

(54) ILLUMINATED RECLOSABLE HARNESS

(71) Applicant: Amphipod, Inc., Seattle, WA (US)

(72) Inventors: Keith S. Willows, Seattle, WA (US);
June A. Angus, Seattle, WA (US);
Antonio Del Rosario, Bellevue, WA (US)

(*) Notice: Subject to any disclaimer, the term of this patent is extended or adjusted under 35 U.S.C. 154(b) by 134 days.

(21) Appl. No.: 17/663,916

(22) Filed: May 18, 2022

(65) Prior Publication Data

US 2022/0276426 A1  Sep. 1, 2022

Related U.S. Application Data

(63) Continuation-in-part of application No. 17/031,043, filed on Sep. 24, 2020, now Pat. No. 11,365,878.

(60) Provisional application No. 63/258,683, filed on May 21, 2021, provisional application No. 62/973,513, filed on Oct. 8, 2019.

(51) Int. Cl.
*F21V 33/00* (2006.01)
*A41D 1/04* (2006.01)
*F21V 8/00* (2006.01)

(52) U.S. Cl.
CPC .............. *G02B 6/001* (2013.01); *A41D 1/04* (2013.01); *F21V 33/0008* (2013.01); *A41D 2300/32* (2013.01)

(58) Field of Classification Search
CPC ... F21V 33/0008; G02B 6/0006; G02B 6/262; G02B 6/4401
See application file for complete search history.

(56) References Cited

U.S. PATENT DOCUMENTS 9,410,694 B2 *  8/2016  Curran ................ H05B 47/105

* cited by examiner

*Primary Examiner* — Joseph L Williams
(74) *Attorney, Agent, or Firm* — Lowe Graham Jones PLLC

(57) ABSTRACT

An illuminated harness includes a front panel assembly and a rear panel, in which the front panel assembly includes a left front panel detachably connected to a right front panel. A side-illuminating fiber optic cable is attached to the front panel assembly and the rear panel assembly, including a first belt portion and a second belt portion joining the front panel assembly to the rear panel, combining to form a belt. The fiber optic cable also forms a left shoulder strap joining the front panel assembly to the rear panel and a right shoulder portion joining the front panel assembly to the rear panel, forming a pair of shoulder straps. A light source is coupled to the fiber optic cable and arranged to transmit light into the fiber optic cable.

27 Claims, 22 Drawing Sheets

ILLUMINATED RECLOSABLE HARNESS

PRIORITY CLAIM

This application claims the benefit of provisional application 63/258,683, filed May 21, 2021, and further is a continuation-in-part of U.S. patent application Ser. No. 17/031,043, now U.S. Pat. No. 11,365,878, which claims the benefit of provisional application 62/973,513, filed Oct. 8, 2019, the contents of each of which are incorporated by reference.

FIELD OF THE INVENTION

The present invention relates to reflective or high visibility garments, and more particularly to an illuminated harness system used to make a user more visible during daylight, night-time and twilight hours while also providing very simple use and comfort. The device of the present invention is designed primarily for active sports joggers and bicyclists. It is also suitable for pedestrians, crossing guards, traffic policemen, mail personnel, skate boarders, delivery personnel, for walking the dog, or working or playing in or around roadways. For a jogger or other user it increases the ability to indicate a presence which might not otherwise be clearly and easily apparent. The illuminated harness of the present invention furthermore provides simple height and waist adjustment.

BACKGROUND OF THE INVENTION

One of the inherent disadvantages of previously existing safety belts, warning belts, or similar straps has been that they are unsuitable for jogging or other athletic activities because they are uncomfortable, confining, and heavy, and they tend to tangle easily and are generally are not intuitively useable.

Existing safety belts or harnesses have suffered from a variety of additional drawbacks, including that they can cause user discomfort through bouncing and chafing; lack optimal ergonomics and contouring relative to the human body; incorporate complex use requirements or components; employ features which present obstacles to optimal athletic or general performance; have limited versatility for a range of uses and a range of users; are difficult or inconvenient to use; can be expensive or difficult to manufacture; have poorly integrated features; and may be asymmetrically weighted when in use, which puts undue stress on the body.

There are many benefits of the preferred illuminated reclosable harness over existing traditional harnesses, vests, apparel and other visibility items meant to be worn on the body. First, the preferred harness is easy to put on and take off and easily adjusts to fit a variety of body sizes and types (generally only one size is needed to fit most people). The preferred harness does not tangle easily when putting it on, and does not restrict the user's mobility while maximizing the user's visibility with illumination or reflectivity. The preferred positioning of central high visibility reflective elements, central to the user's upper body, locates this reflective area (front and/or back) for excellent visibility without limiting user mobility.

In its preferred form, the device of the present invention provides an effective visibility warning to others, is easily adjustable, intuitive to use, comfortable, fits a variety of body shapes and sizes easily, is simple to manufacture, does not tangle easily, is aesthetically pleasing, dissipates body heat, and provides the option of allowing the user to choose from various illumination modes such as flashing, non-flashing, and the possibility of a variety illumination colors and effects.

SUMMARY OF THE INVENTION

The preferred version of the invention is an illuminated harness, which is also preferably "reclosable" through the use of a separable front panel that may generally take the form of a vest. In one version, the illuminated harness includes a front panel assembly having a left front panel, a right front panel, and a front panel fastener operable to selectively secure the right front panel to the left front panel and to detach the right front panel from the left front panel. It further includes a rear panel and a side-illuminating fiber optic cable and a light source coupled to the fiber optic cable and being arranged to transmit light into the fiber optic cable.

Most preferably, the fiber optic cable is attached to the right front panel and the left front panel, the fiber optic cable being slidably moveable with respect to both the right front panel and the left front panel for adjustment of the front panel assembly with respect to the fiber optic cable when the fiber optic cable is coupled to the light source. The fiber optic cable is further attached to the rear panel and being slidably moveable with respect to the rear panel for adjustment of the rear panel along the fiber optic cable when the fiber optic cable is coupled to the light source.

The fiber optic cable, when attached to the front panel assembly and the rear panel, defines a first belt portion joining the left front panel to the rear panel, a second belt portion joining the right front panel to the rear panel, whereby the first belt portion and the second belt portion are configured to be positioned about a waist of a user when the illuminated harness is worn by the user, a right shoulder strap joining the right front panel to the rear panel, and a left shoulder strap joining the left front panel to the rear panel, whereby the left shoulder strap and the right shoulder strap are configured to be positioned over the shoulders of the user when the illuminated harness is worn by the user and the first belt portion and the second belt portion are positioned about the waist of the user.

In some examples, the fiber optic cable includes a first fiber optic cable and a second fiber optic cable, the first fiber optic cable continuously forming the first belt portion and the left shoulder strap, and the second fiber optic cable continuously forming the second belt portion and the right shoulder strap.

In some preferred versions, the illuminated harness includes a first channel and a second channel formed in the left front panel, a third channel and a fourth channel formed in the right front panel, and in which the first fiber optic cable is threaded into the first channel and the second channel for slidable movement of the first fiber optic cable within the first channel and the second channel, and the second fiber optic cable being threaded into the third channel and the fourth channel for slidable movement of the second fiber optic cable within the third channel and the fourth channel.

In some examples, the first fiber optic cable includes a terminal end, the terminal end of the first fiber optic cable being received in the second channel.

In some versions of the illuminated harness, a first rear channel, a second rear channel, a third rear channel, and a fourth rear channel are formed in the rear panel. The second fiber optic cable is threaded into the first rear channel and the second rear channel for slidable movement of the first fiber optic cable within the first rear channel, and the second fiber optic cable is threaded into the third rear channel and the fourth rear channel for slidable movement of the second fiber optic cable within the fourth rear channel.

In yet other examples, the left front panel is formed from a left front panel backing layer, a left front panel translucent layer, and a left front panel reflective layer between the left front panel backing layer and the left front panel translucent layer, and further wherein each of the first channel and the second channel are defined between the left front panel translucent layer and the left front panel reflective layer.

In some examples, the left front panel and/or the right front panel translucent layer is a transparent layer.

In some examples, the right front panel is formed from a right front panel backing layer, a right front panel translucent layer, and a right front panel reflective layer between the right front panel backing layer and the right front panel translucent layer, and further wherein each of the third channel and the fourth channel are defined between the right front panel translucent layer and the right front panel reflective layer.

In some versions, the rear panel is formed from a rear panel backing layer, a rear panel translucent layer, and a rear panel reflective layer between the rear panel backing layer and the rear panel translucent layer, and further wherein each of the first, second, third, and fourth rear channels are defined between the rear panel translucent layer and the rear panel backing layer, or alternatively between the rear panel translucent layer and the rear panel reflective layer, or alternatively between the rear panel backing layer and the rear panel reflective layer.

In some preferred versions, the illuminated harness includes a left side panel, the first fiber optic cable extending through the left side panel, and a right side panel, the second fiber optic cable extending through the right side panel.

In some versions, the left side panel is detached from the front panel assembly and the rear panel, and the left side panel has a left side panel channel, the first fiber optic cable being slideably received within the left side panel channel. The right side panel is detached from the front panel assembly and the rear panel, and the right side panel comprises a right side panel channel, the second fiber optic cable being slideably received within the right side panel channel.

Most preferably, a housing containing a battery provides power to the light source and having a power switch, the housing being attached to the rear panel.

In preferred examples, the left shoulder strap is formed by two adjacent sections of the first fiber optic cable and the right shoulder strap is formed by two adjacent sections of the second fiber optic cable.

Most preferably, the fastener is in the form of a hook and loop fastener.

In some examples, the illuminated harness is formed with a front panel assembly having a base, a top, a left side, and a right side, the front panel assembly further having a left front panel detachably connected to a right front panel via a fastener. A rear panel has a base, a top, a left side, and a right side, and a side-illuminating fiber optic cable and a light source are coupled to the fiber optic cable and arranged to transmit light into the fiber optic cable.

The fiber optic cable is attached to the front panel assembly such that the light from the fiber optic cable is visible between the top of the front panel assembly and the base of the front panel assembly, the fiber optic cable further being attached to the rear panel assembly such that the light from the fiber optic cable is visible between the top of the rear panel assembly and the base of the rear panel. The fiber optic cable has a first belt portion joining the left front panel to the rear panel, a second belt portion joining the right front panel to the rear panel, whereby the first belt portion and the second belt portion are configured to be positioned about a waist of a user when the illuminated harness is worn by the user, a left shoulder strap joining the left front panel to the rear panel, and a right shoulder strap joining the right front panel to the rear panel, whereby the first shoulder strap and the second shoulder strap are configured to be positioned over the shoulders of the user when the illuminated harness is worn by the user.

In some examples, the fiber optic cable further includes a first fiber optic cable and a second fiber optic cable, the first fiber optic cable continuously forming the first belt portion and the left shoulder strap, and the second fiber optic cable continuously forming the second belt portion and the right shoulder strap.

In other examples, the first fiber optic cable extends continuously from the light source to the left shoulder strap to the first belt portion and again to the left shoulder strap, wherein the left shoulder strap is formed by two sections of the first fiber optic cable. Preferably, the second fiber optic cable also extends continuously from the light source to the right shoulder strap to the second belt portion and again to the right shoulder strap, wherein the right shoulder strap is formed by two sections of the second fiber optic cable.

In some examples, the illuminated harness includes a first channel and a second channel formed in the left front panel, and a third channel and a fourth channel formed in the right front panel. Each of the first, second, third, and fourth channels has a transparent outer layer and a reflective interior layer arranged to reflect light toward the transparent outer layer, the first fiber optic cable being threaded into the first channel and the second channel for slidable movement of the first fiber optic cable within the first channel and the second channel, and the second fiber optic cable being threaded into the third channel and the fourth channel for slidable movement of the second fiber optic cable within the third channel and the fourth channel.

In some preferred examples the illuminated harness includes a left side panel, the first fiber optic cable extending through the left side panel, and a right side panel, the second fiber optic cable extending through the right side panel.

In some versions, the left side panel is detached from the front panel assembly and the rear panel, and the left side panel comprises a left side panel channel, the first fiber optic cable being slideably received within the left side panel channel, and the right side panel is detached from the front panel assembly and the rear panel, and the right side panel comprises a right side panel channel, the second fiber optic cable being slideably received within the right side panel channel.

In preferred versions, the light source is coupled to a power source positioned on the rear panel assembly between the first belt portion and the second belt portion, the light source further having a first light source attached to the first fiber optic cable and a second light source attached to the second fiber optic cable.

In some versions, the harness includes a first, second, third, and fourth rear channels formed in the rear panel, the second and third rear channels being separated by a U-shaped weld formed in the rear panel. The first fiber optic cable is threaded into the third and fourth rear channels for slidable movement of the first fiber optic cable within the fourth rear channel, and the second fiber optic cable is threaded into the first and second rear channels for slidable movement of the second fiber optic cable within the first rear channel.

Preferably, the first fiber optic cable is joined to the second fiber optic cable adjacent the first light source and the second light source, and further wherein the U-shaped weld is positioned to restrict movement of the joined first fiber optic cable and the second fiber optic cable.

Most preferably, the rear panel is formed form a plurality of layers, including a transparent outer layer, a reflective intermediate layer, and a backing layer.

In some examples, the U-shaped weld joins the transparent outer layer, the reflective intermediate layer, and the backing layer.

BRIEF DESCRIPTION OF THE DRAWINGS

Preferred and alternative examples of the present invention are described in detail below with reference to the following drawings.

FIG. 24 is shown enlarged and cut away at either end to simplify the drawing and for clarity.

DETAILED DESCRIPTION OF THE PREFERRED EMBODIMENT

Figure 1:
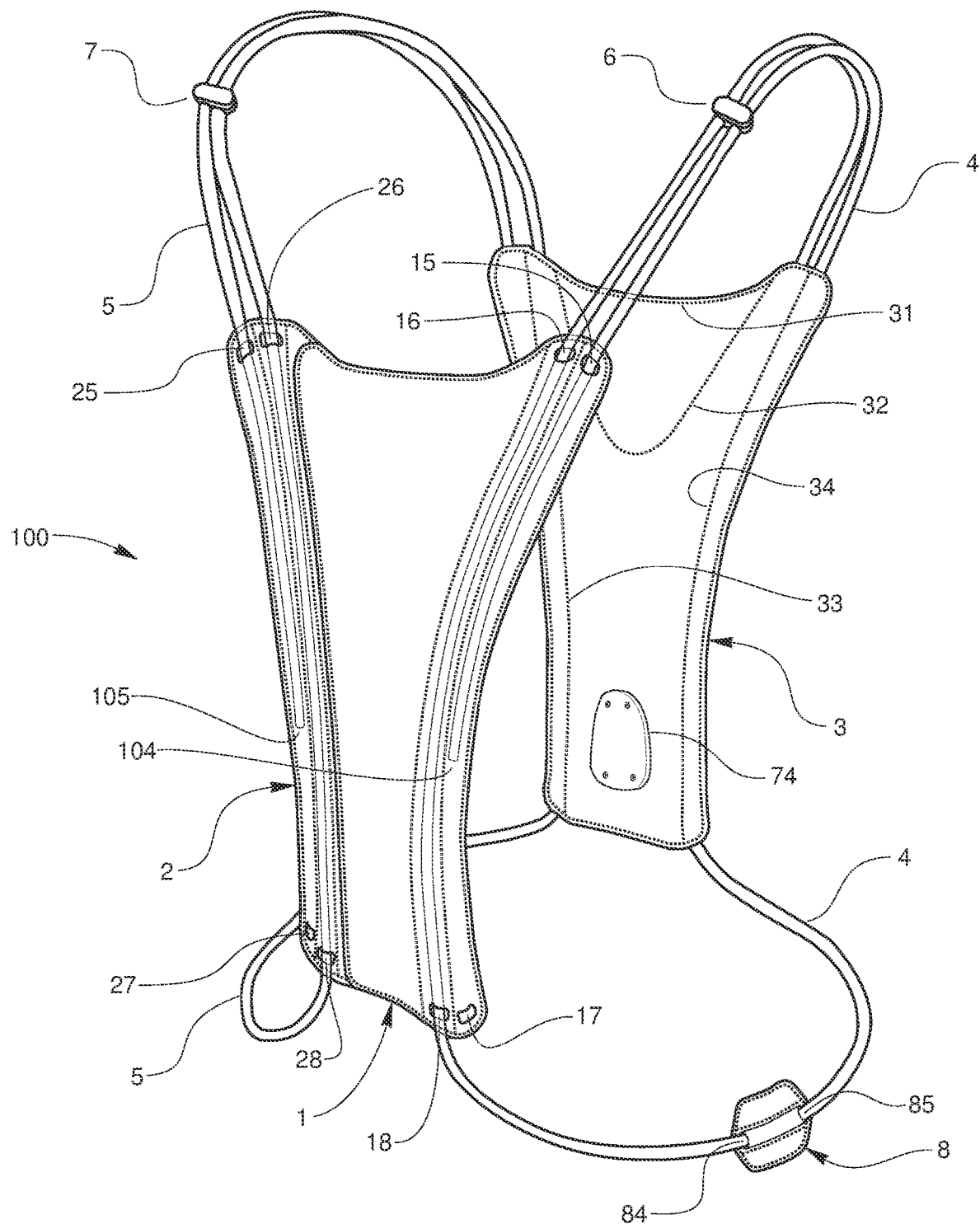
FIG. 1 is a front three-quarter perspective view of a preferred illuminated reclosable harness.

FIG. 1 is a front three-quarter perspective view of a preferred illuminated harness 100. As illustrated, the illuminated harness is composed of a front panel assembly having a left front panel 1 and a right front panel 2, a rear panel assembly 3, a first side-illuminating optical fiber optic cable 4 and a second side-illuminating fiber optic cable 5. A first side panel 8 is provided, attached to the first cable 4. A second side panel 9 is provided opposite the first side panel, attached to the second cable 5, and is visible in FIG. 2. Cord locks 6, 7 are optionally included, to join adjacent lengths of the first cable together, and to join adjacent lengths of the second cable together, particularly in the region where the lengths of cable serve as a shoulder strap. Additional features illustrated in FIG. 1 are discussed further below.

Figure 2:
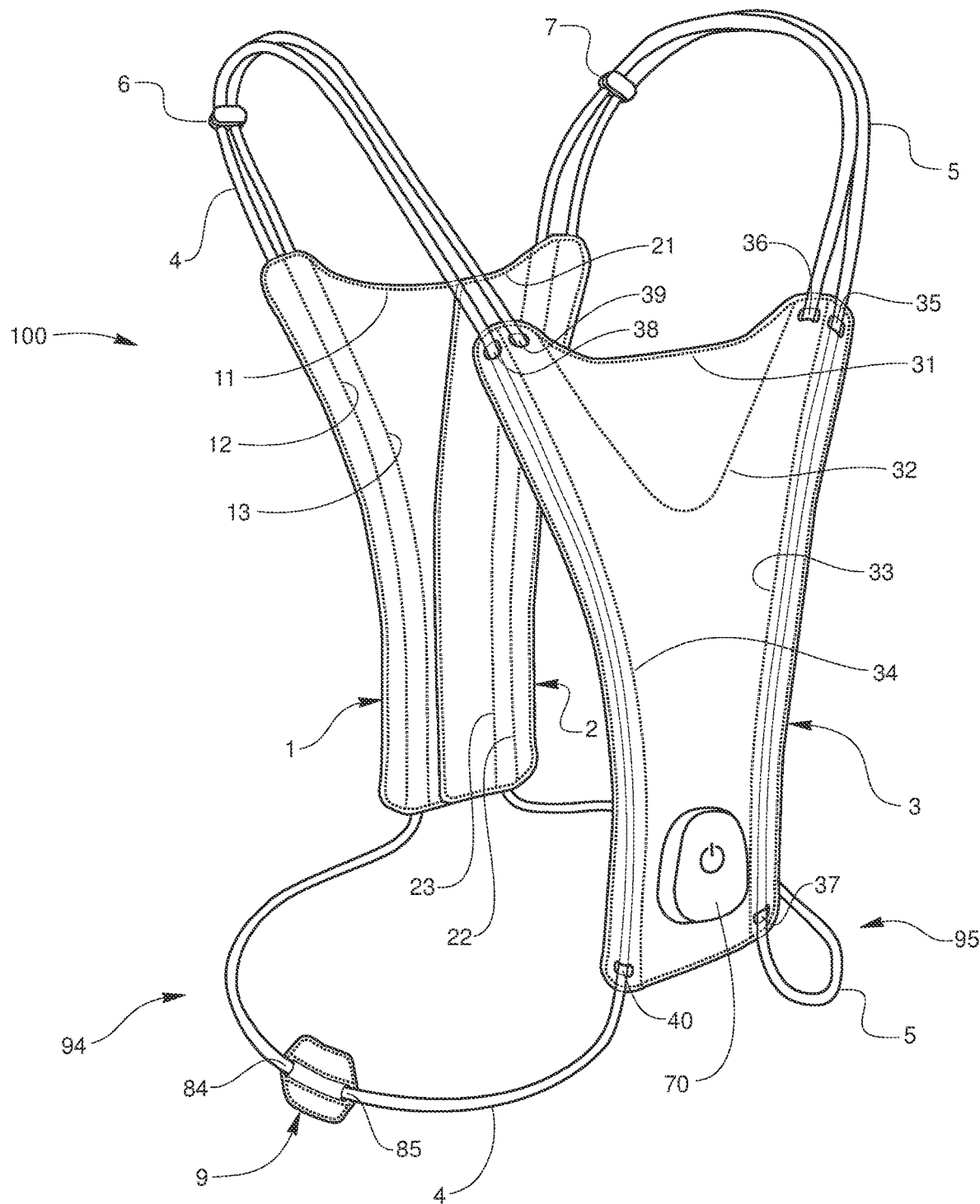
FIG. 2 is a rear three-quarter perspective view of the preferred harness.
Figure 3:
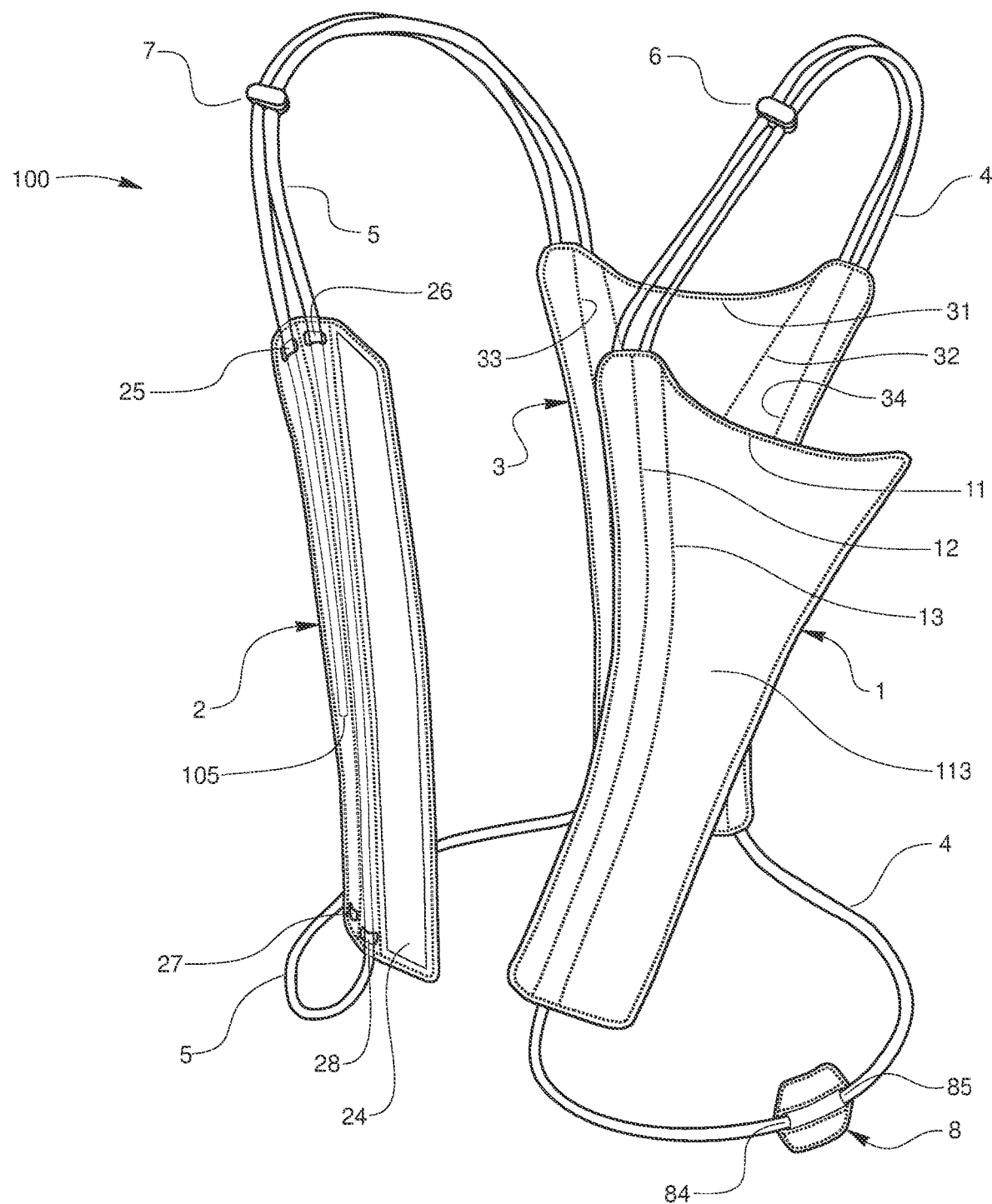
FIG. 3 is a is a front three-quarter perspective view of the preferred harness, showing front panels 1, 2 in an unfastened state such that the harness can be worn like a vest and re-fastened on a user's torso using fasteners such as hook and loop fasteners employed as a hook strip 24 which mates with a loop strip 113.

The front panel assembly is preferably composed of two user separatable components: a left front panel assembly 1 and a right front panel assembly 2. In FIGS. 1 and 2, the left and right front panel assemblies are in a joined position in which they are fastened to one another. In FIG. 3 the left and right front panel assemblies are separated from one another and in a separated position. Most preferably, as discussed further below, the left front panel assembly 1 and right front panel assembly 2 are formed with fasteners such as complementary strips of hook and loop fasteners allowing them to be readily joined to or separated from one another. Thus, the front panel assembly can preferably be joined or separated by joining or separating the hook and loop (Velcro or the like) components integrated into the front left and front right panels. In other versions of the invention, yet other fasteners may be used, such as snaps, buttons, zippers, ties, or others. With the use of the front panel fastener, the illuminated harness 100 can be worn or removed from the user much like a vest or jacket.

Figure 14:
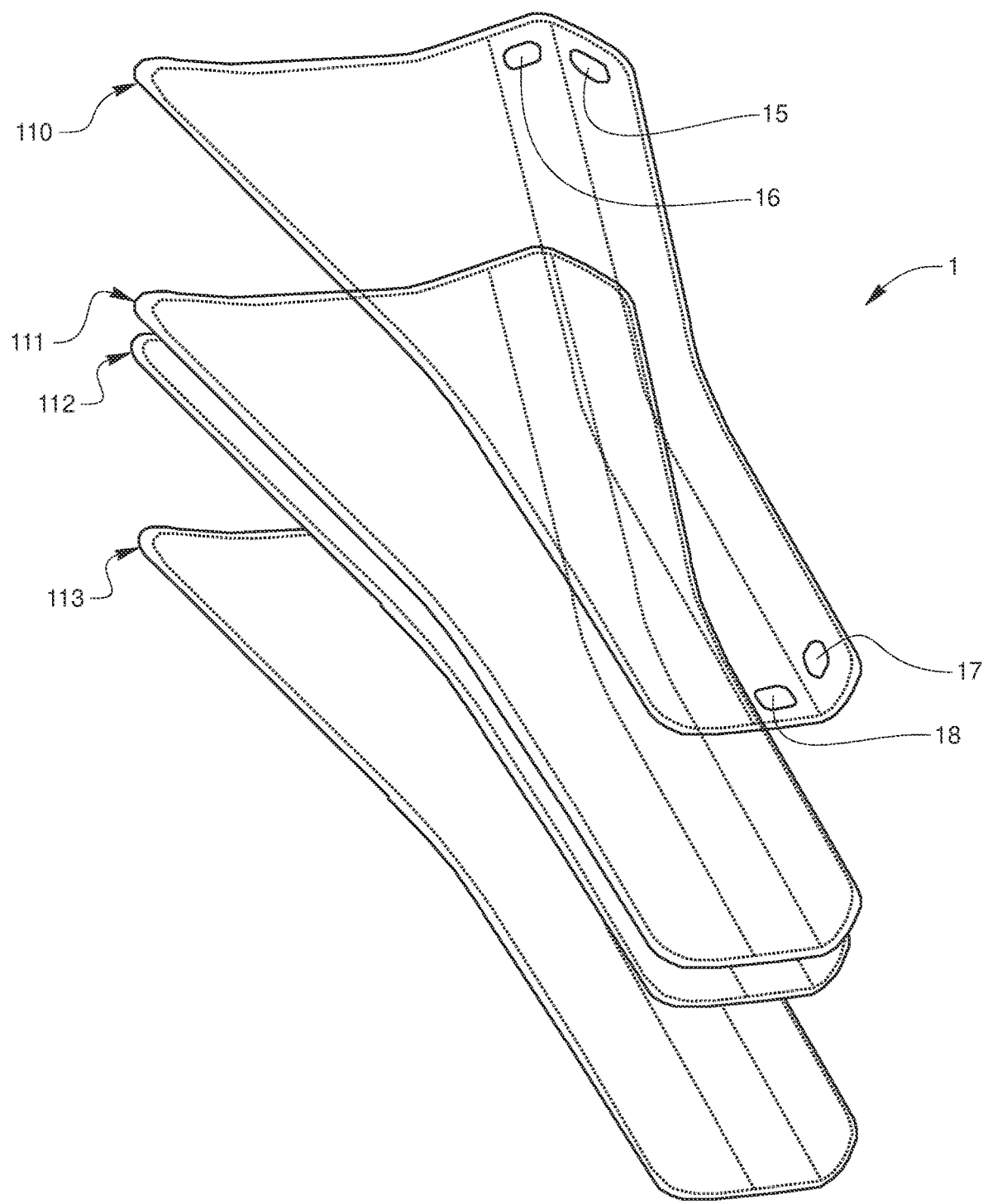
FIG. 14 is an exploded view of the left panel 1 formed from layers 110, 111, 112 and having a loop strip 113.
Figure 15:
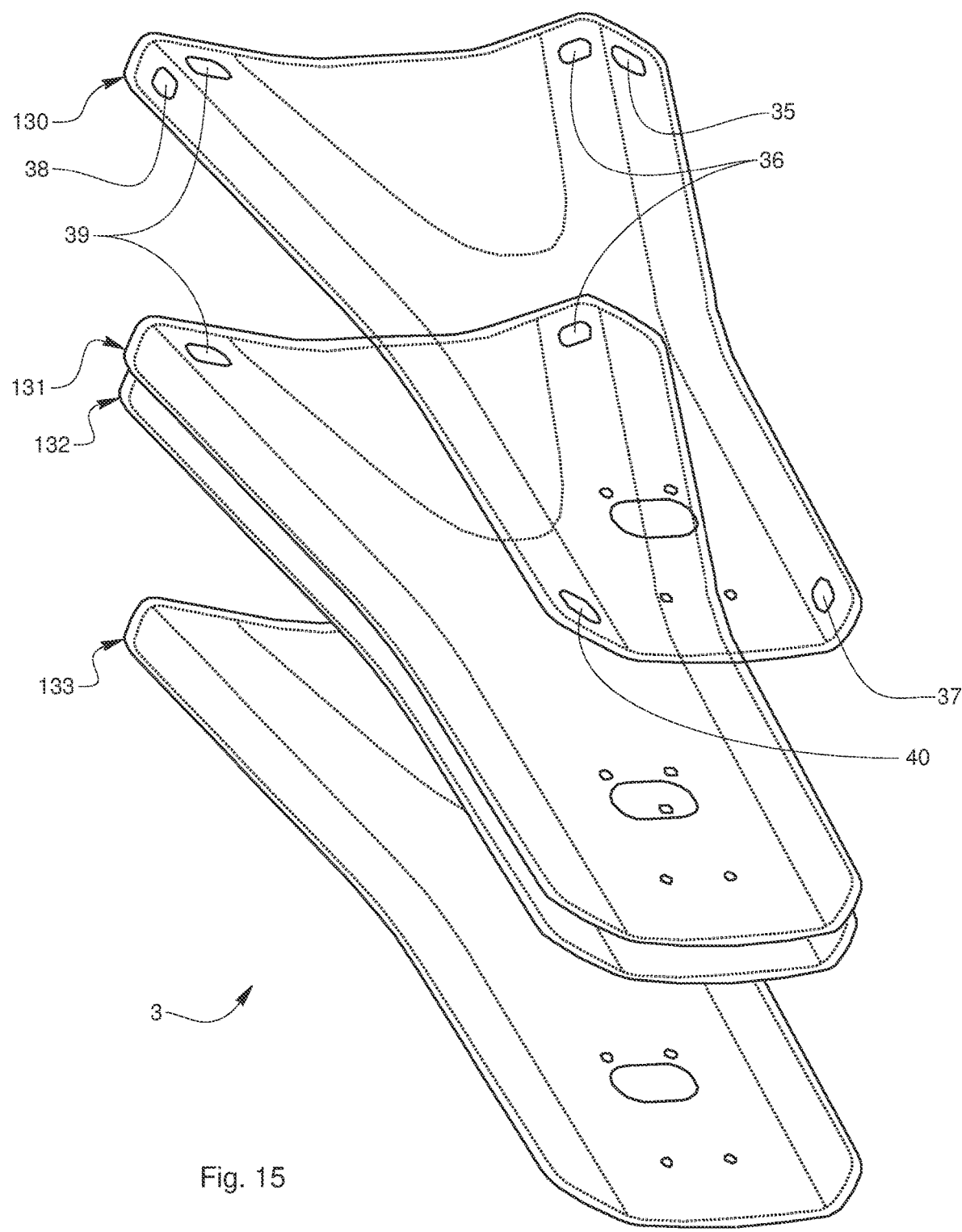
FIG. 15 is an exploded view of the back panel 3 formed from layers 130, 131, 132 and 133.

The left front panel 1 is preferably configured from several layers, such as seen in FIG. 14. In one example, the left front panel includes a front layer 110, back layer 113, reflective layer 111 and a reflective backing layer 112 (as shown in FIG. 14). In the version as illustrated, each of the layers is configured with substantially the same size and perimeter; in alternate versions one or more of the layers may have a different size, shape, or perimeter from one or more of the others. The front layer 110 is preferably transparent and is die cut or the like from clear or translucent vinyl (pvc or the like) or thermoplastic elastomer or the like. The rear layer 113 is preferably die cut or the like from loop (Velcro-compatible nylon or polyester or the like) sheet material wherein the loops are facing outward (that is, away from the other layers forming the panel) such that it is the left front panel (and the rear layer) is attachable to a hook panel 24 which is affixed to the right front panel 2 to join the left front panel 1 to the right front panel 2. In some instances in this description, the hook and loop portions of the panels are illustrated and described as being "layers" or "strips" of material. In either case, the use of terms such as "layer" or "strip" should not convey any particular size or shape of the hook and loop materials unless accompanied by additional description indicating that the hook or loop is formed in an elongated fashion as a narrow strip or is formed to have a perimeter matching that of the rest of the layers forming the corresponding panel.

The left front panel 1 (which can be seen in FIG. 6, 7, 14 and other views) is preferably comprised of 4 layers of sheet material, organized as in the exploded view of FIG. 14. The front layer 110 overlays the retro-reflective layer 111, which is preferably backed with a support layer 112 formed from white or silver pvc or the like. A rear layer 113 of loop material serves as the backing of the panel, with the loops facing outwardly and away from this assembly. Holes 15, 16, 17 and 18 are die cut through the front layer 110 to form a pathway such that the first fiber cable 4 can be fed through as shown.

Figure 6:
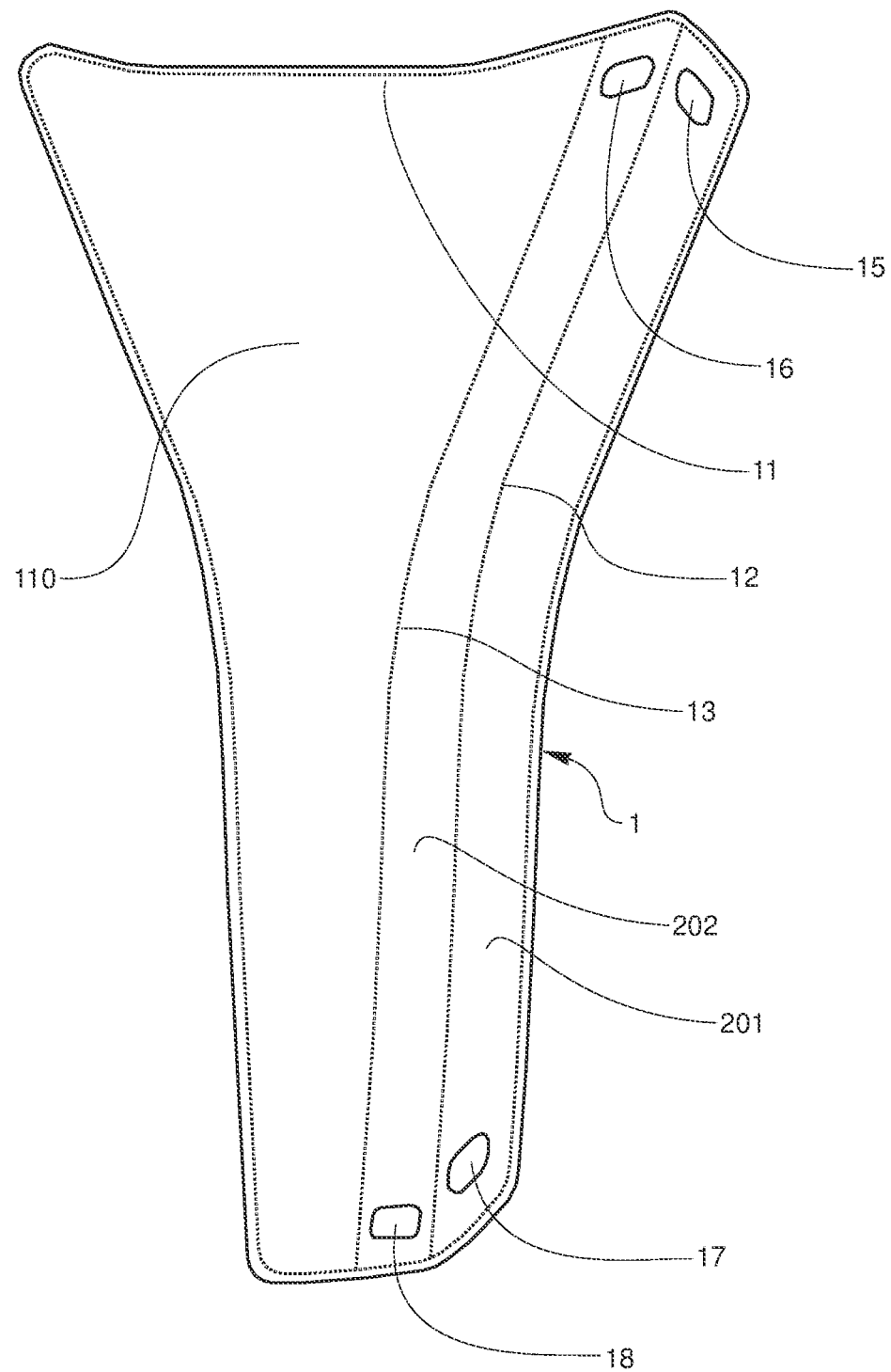
FIG. 6 is a front view of a left front panel 1 of the preferred harness.
Figure 7:
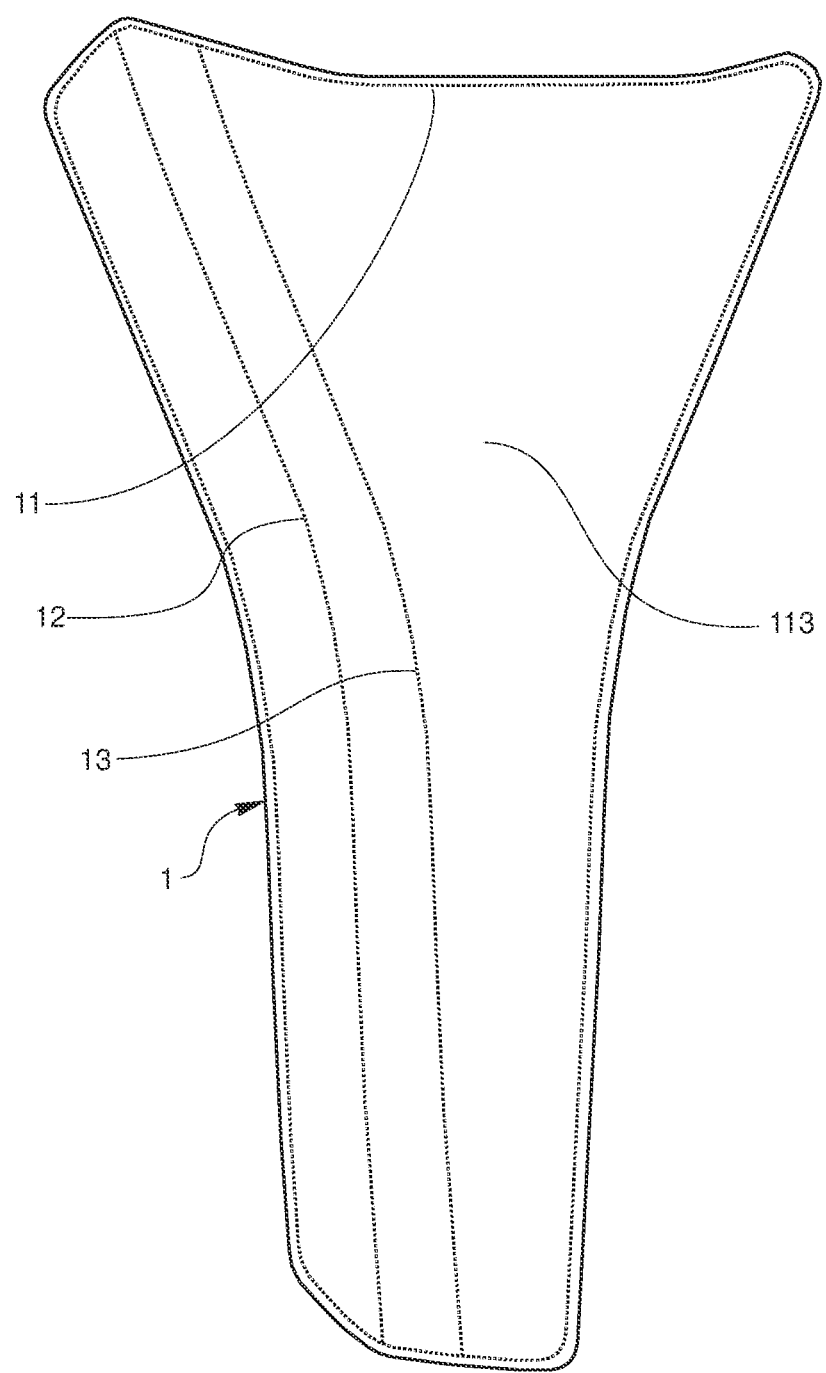
FIG. 7 is a rear view of the left front panel 1.

In the preferred version, each of the layers 110, 111, 112 and 113 are die cut in a shape as shown and heat welded, ultrasonically welded or the like at their perimeter at weld perimeter 11, indicated in FIG. 6. A further weld joins the panel layers together along interior weld lines 12 and 13 to form internal channels 201 and 202. The first fiber cable 4 can be fed through a top outer hole 15 and through a first channel 201 such that it emerges from a bottom outer hole 17. The first fiber cable 4 can further be fed through a top inner hole 16 and through a second channel 202 such that it emerges from a bottom inner hole 18.

As previously mentioned, the front layer 110 is preferably made of clear or translucent sheet material, and consequently the fiber 4 is visible when trapped in the channel 201 (between the front layer and the next-adjacent layer, which in this case is the retro-reflective layer), formed from hole 15 to hole 17 and confined at its sides by perimeter weld 11 and weld 12. Further, a portion of the length of the fiber 4 is preferably trapped in the second channel 202 (between the front layer and the next-adjacent layer, which in this case is the retro-reflective layer) formed from hole 16 to hole 18 confined at its sides by weld 12 and weld 13.

Channels 201 and 202 are preferably sized such that the optic fiber is frictionally held in place but can slide through the channels under an urging force by the user. Thus, the vest can be user-adjusted by changing the size of the fiber loops defining a first belt portion 94 and a second belt portion 95, best seen in FIG. 1, and as described further below.

Figure 4:
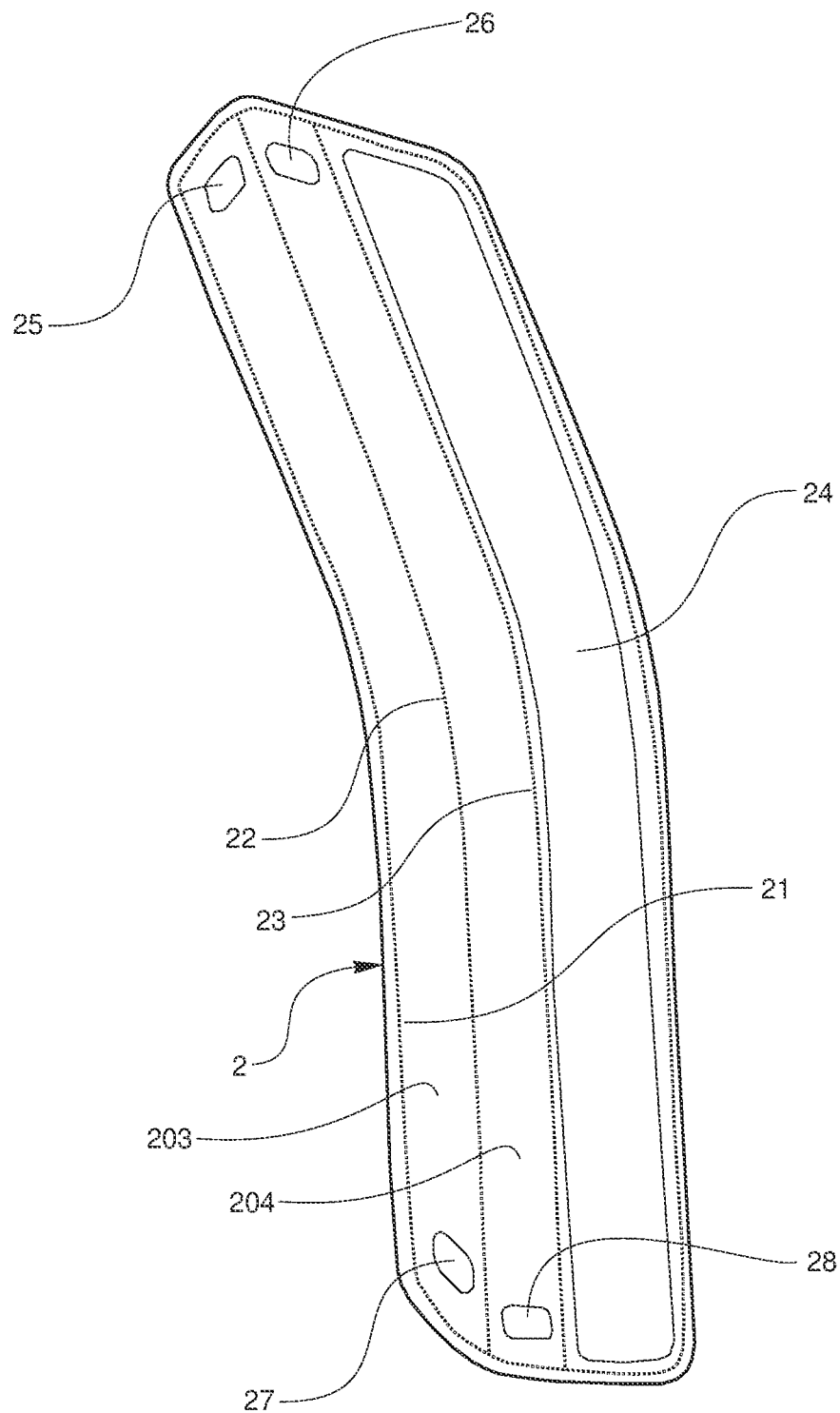
FIG. 4 is a front view of a right front panel 2 of the preferred harness.
Figure 5:
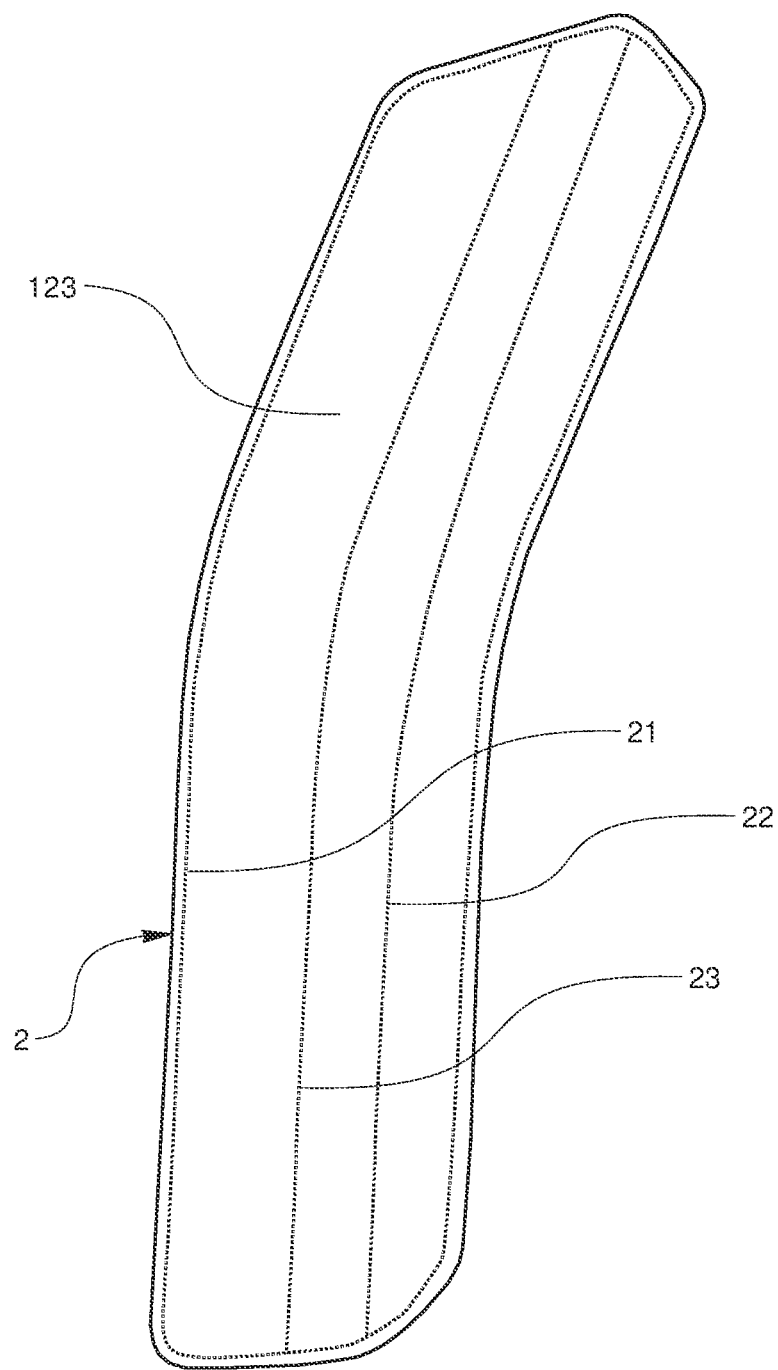
FIG. 5 is a rear view of the right front panel 2.
Figure 13:
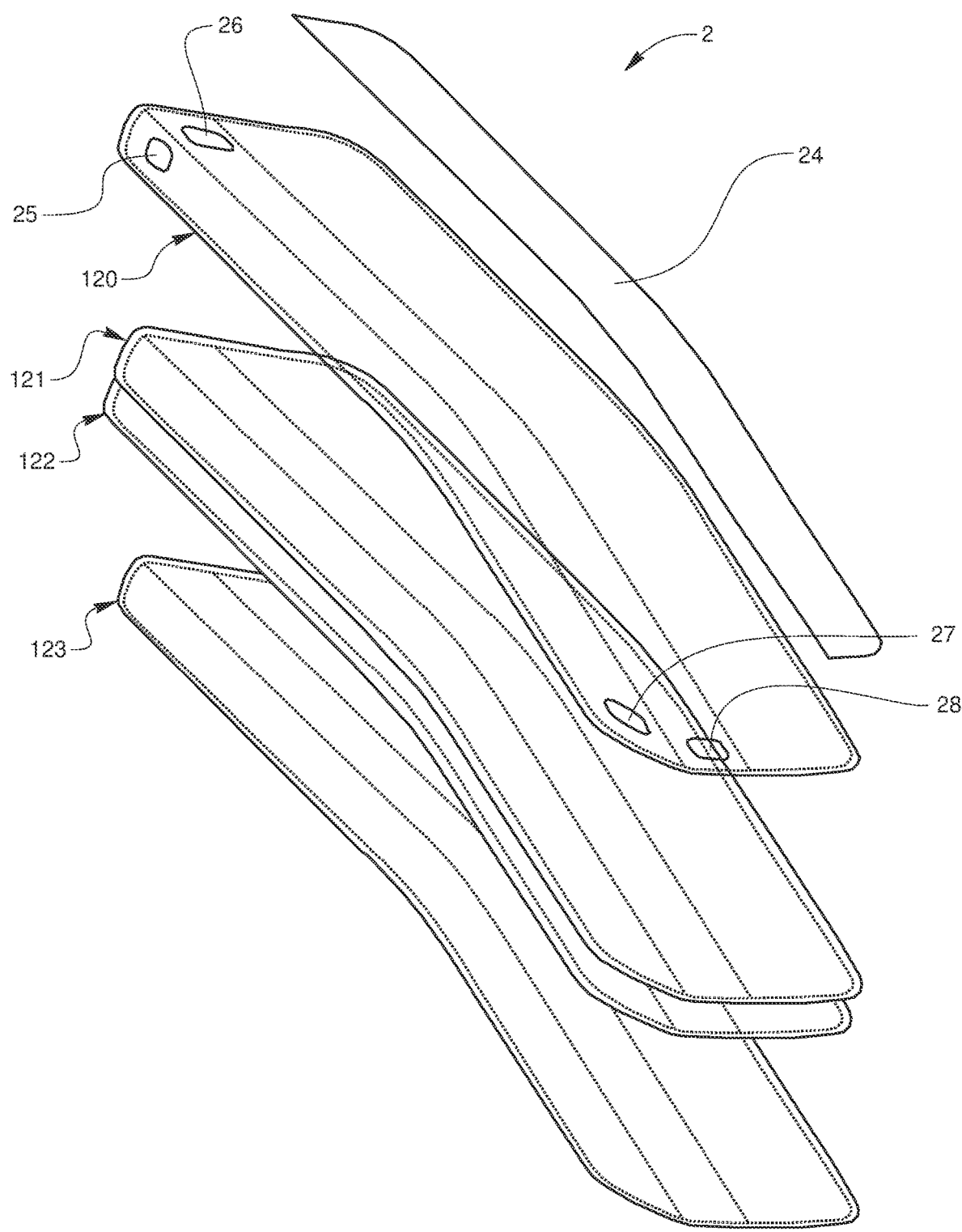
FIG. 13 is an exploded view of the right front panel 2 formed from a series of layers 120, 121, 122 and 123 and having a hook strip 24.

The right front panel 2 (which can be seen in FIG. 4, 5, 13 and other views) is preferably comprised of 4 layers of sheet material, organized in the same manner as with the left front panel 1 and as shown in the exploded view of FIG. 13. A front layer 120 overlays the retro-reflective layer 121 which is preferably backed with a support layer 122 formed from white or silver pvc. A rear layer 123 of loop or the like material serves as the backing of the panel, wherein loops face outward away from this assembly. Layer 123 does not need to be Velcro™ type loop and can alternatively be some other similar flocked material or the like such that it matches the look of the back of the left front panel 1. A strip 24 of hook material is attached to an outer surface of the front of the right front panel, preferably by attaching it to the front layer 120. While the rear of the left front panel 1 mates with the hook strip 24, the rear of the right front panel 2 does not need the same loop function and thus can be made of a material that is comfortably worn against the body but is not necessarily hook-and-loop compatible.

Holes 25, 26, 27 and 28 (see, e.g., FIG. 4) are die cut through the outer clear layer 120 to form a pathway such that fiber 5 can be fed through as shown. Layers 120, 121, 122 and 123 are die cut in a shape as shown and heat welded, ultrasonically welded or the like at their perimeter at weld perimeter 21. These layers 120, 121, 122 and 123 are further welded together along weld interior weld lines 22 and 23 to form channels 203 and 204. The second fiber 5 can be fed through a top outer hole 25 and through a third channel 203 such that it emerges from bottom outer hole 27. The fiber 5 can further be fed through a top inner hole 26 and through a fourth channel 204 such that it emerges from a bottom inner hole 28. As previously mentioned, the front layer 120 is preferably made of clear or translucent sheet material such that second fiber 5 is visible when trapped in the third channel 203 and fourth channel 204. The second and third channels likewise are dimensioned to provide a relatively snug fit for the fiber, allowing it to slide through the channels but providing friction to hold the fiber in place in the absence of an urging force by the user.

The hook strip 24 is affixed to the front surface of layer 120 by adhesive, ultrasonic welding, heat welding (or sewing) or the like such that the hooks face outward away from these assembled layers. In this manner, the hook strip 24 of the right front panel is attachable to the loops provided on the back layer 113 of left front panel 1, whereby the back layer 113 of left front panel 1 can be affixed to right panel 2 via mating hook strip 24 with back panel loop material 113.

Figure 8:
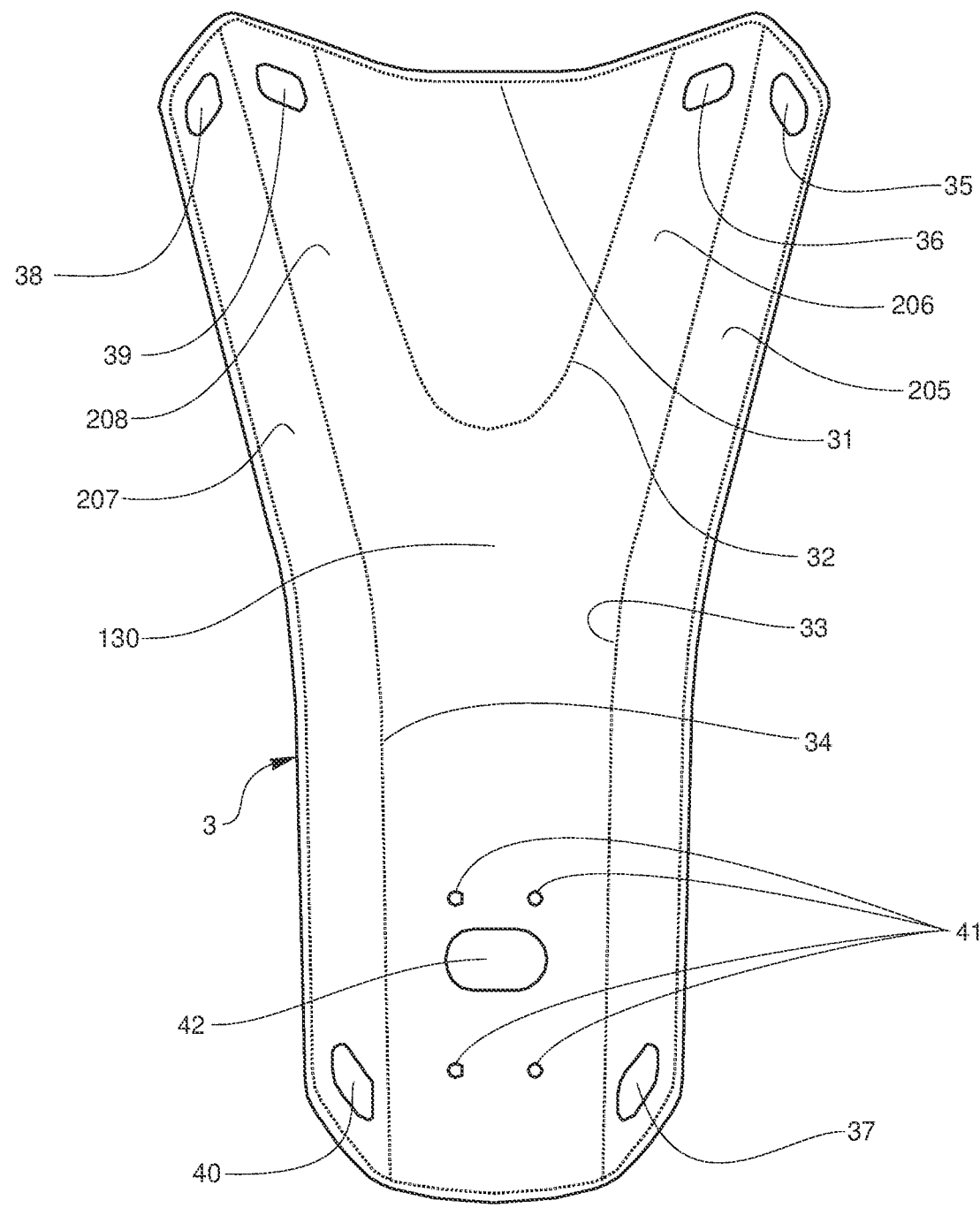
FIG. 8 is a front view of a back panel 3 of the preferred harness.
Figure 9:
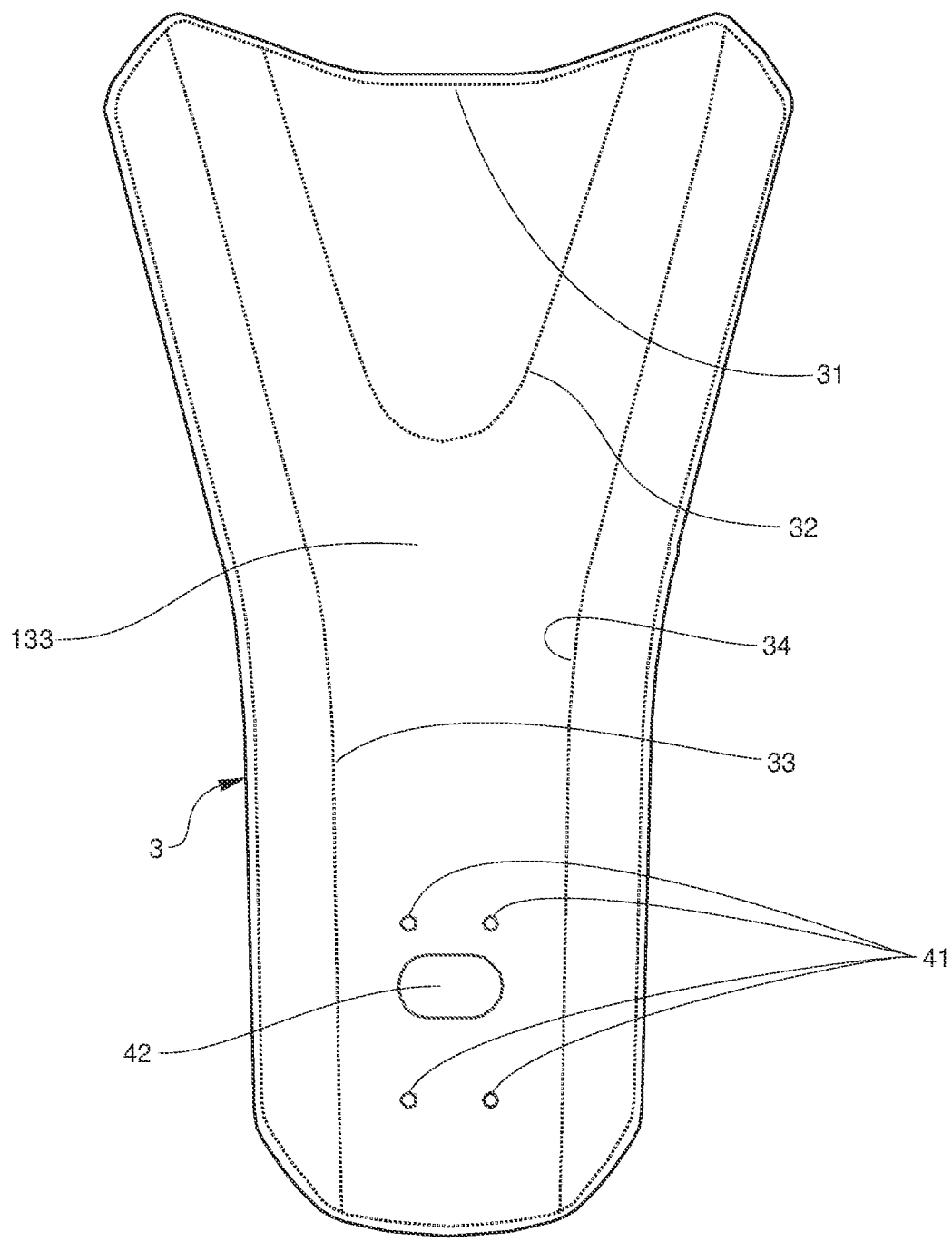
FIG. 9 is a rear view of the back panel 3.
Figure 11:
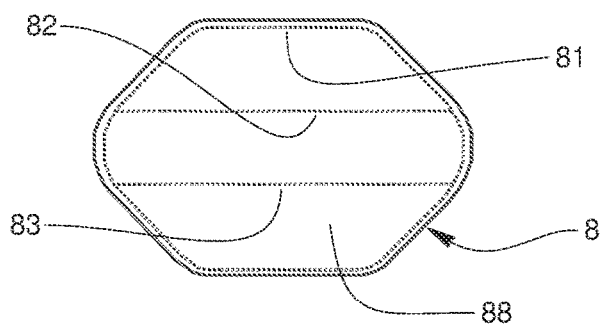
FIG. 11 is a rear view of the first side panel 8.
Figure 12:
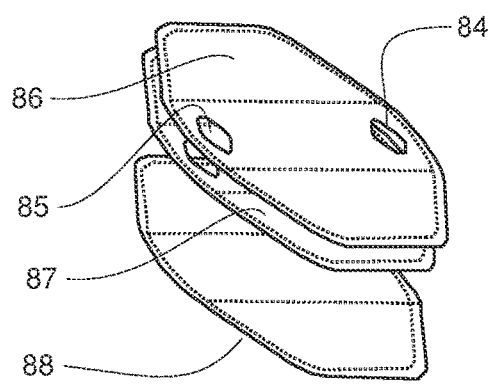
FIG. 12 is an exploded view of the first side panel 8 formed from a series of layers 86, 87 and 88.

A rear panel 3 (which can be seen in FIG. 8, 9, 15 and other views) is preferably comprised of 4 layers of sheet material, including a clear (or translucent) front layer 130 which overlays a retro-reflective layer 131, which is backed with a white or silver pvc support layer 132 and backed with a flocked backing layer 133 wherein the flocking (or other soft facing similar to microfleece or loop material from a hook-and-loop fastener) faces outward away from this assembly (and thus may be comfortably worn against the body).

Holes 35, 36, 37, 38, 39 and 40 are die cut through the clear outer layer 130 to form pathways 205, 206, 207 and 208 (see FIG. 8) for the first fiber 4 and the second fiber 5. The layers 130, 131, 132 and 133 are welded or otherwise joined at their perimeter, along a weld perimeter 31. The rear panel is further welded together along first and second rear channel weld lines 33 and 34 and along an upper interior U-shaped weld line 32, thereby forming channels in the rear panel. A first rear channel 205 extends from a first rear upper hole 35 to a first rear lower hole 37, and is bounded by the perimeter weld line and the first rear channel weld line 33. A second rear channel 206 is partially bounded by the first rear channel weld line 33 and the U-shaped weld line 32, and includes an opening at the second rear upper hole 36. A third rear channel 208 is partially bounded by the second rear channel weld line 34 and the U-shaped weld line 32, and includes an opening at the third rear upper hole 39. A fourth rear channel 207 extends from a fourth rear upper hole 38 to a second rear lower hole 40, and is bounded by the perimeter weld line 31 and the second rear channel weld line 34.

The second fiber 5 can be fed through hole 37 through channel 205 such that it emerges from hole 35, and further through hole 36 and through channel 206 to engage with an LED circuit assembly as described further below. Because the outer layer 130 is preferably made of clear or translucent sheet material, the fiber 5 is visible when trapped in the first rear channel 205.

Similarly, the first fiber 4 can be fed through hole 40 through channel 207 such that it emerges from hole 38, and further through hole 39 and through channel 208 to engage with the LED circuit assembly. The first fiber is likewise visible through the outer clear layer of the rear panel. Each of the channels is preferably sized such that the fibers are frictionally held in place within the channels, but allowing the fibers to slide through the channels under an urging force by the user in order to adjust the size of the fiber loops 94 and 95.

FIG. 3 is a front three-quarter perspective view of a preferred harness, showing the left front panel 1 and the right front panel 2 detached from one another and in an open or unfastened position. From this position, a user may wrap the harness around the user's torso and then fasten the left and right front panels together (joining the hook strip 24 to the loop panel or strip 113) to achieve a fastened or closed position such as shown in FIG. 1.

Figure 10:
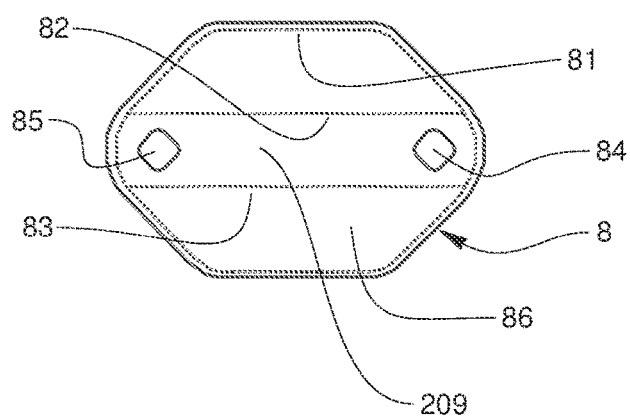
FIG. 10 is a front view of a first side panel 8 of the preferred harness. A second panel 9 is preferably formed identically.

FIG. 10 is a front view of a first side panel 8. A second side panel 9 is preferably identical to the first side panel 8. The first side panel 8 (which can be seen in FIG. 10, 11, 12 and other views) is preferably comprised of 3 layers of die-cut sheet material (or 4 layers if a clear layer is desired). In a preferred version, the layers include a retro-reflective layer 86 which is preferably backed with a white or silver pvc or the like backing layer 87 and a rear facing layer 88 of flocking (or the like soft facing) which faces outward away from this assembly (and thus may be comfortably worn against the body).

First and second side panel holes 84 and 85 are die cut through the outer retro-reflective layer 86 as well as the backing layer 87 to form pathways such that optic fiber can be fed through. Each of the first side panel layers 86, 87 and 88 are die cut in a shape as shown and heat welded, ultrasonically welded or the like at their perimeter at weld perimeter 81. A pair of side panel internal welds are also applied, along weld lines 82 and 83, forming a channel 209 so that an applicable optic fiber (such as fiber 4 or 5) can be fed through a side panel hole 84, through the channel 209, and emerge from another side panel hole 85, so that the fiber is confined at its sides by weld 82 and weld 83.

Figure 16:
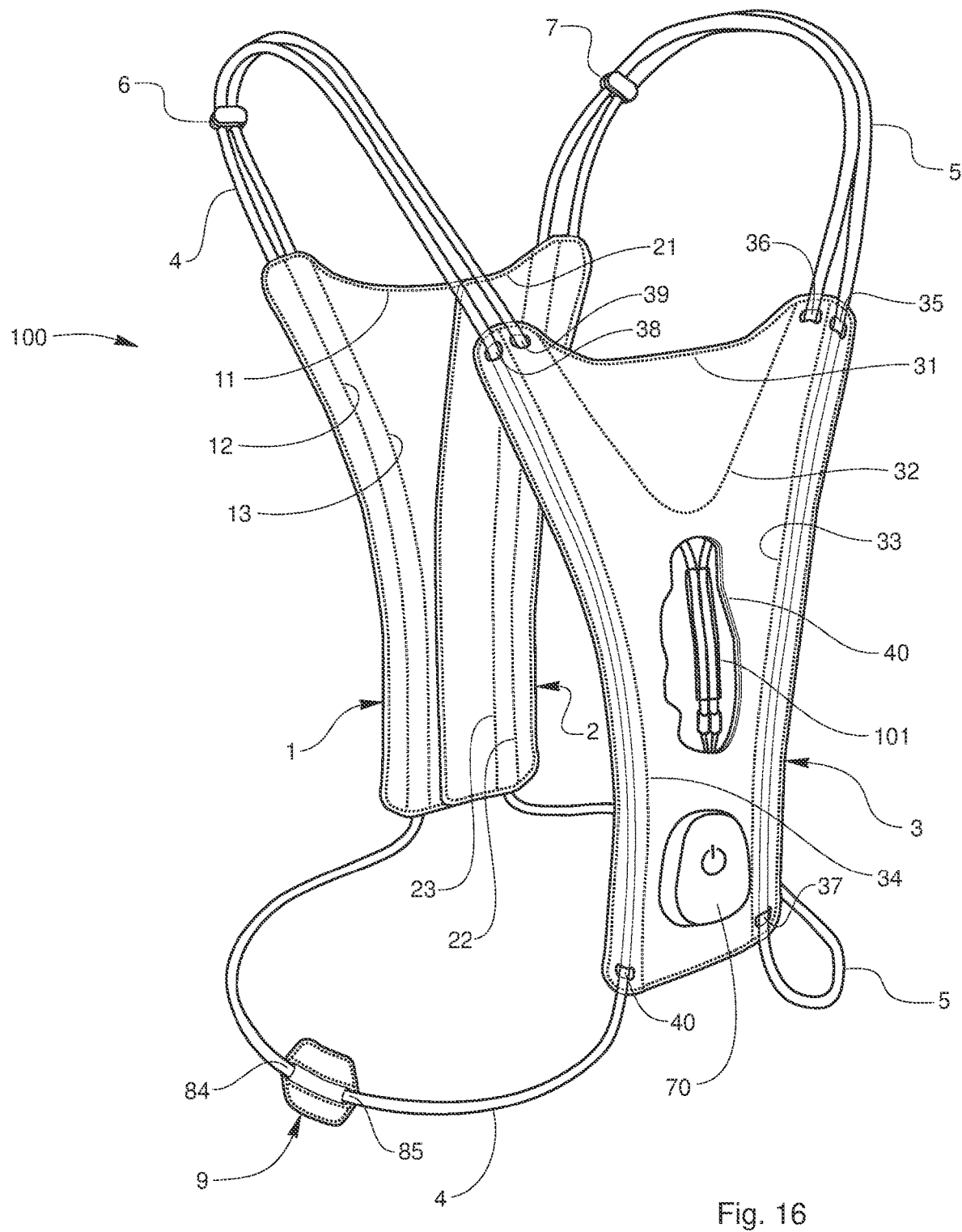
FIG. 16 is a rear three-quarter perspective view of a preferred embodiment, with a cut-away section 40 included to illustrate internal optic fibers attached to LED light source(s).
Figure 17:
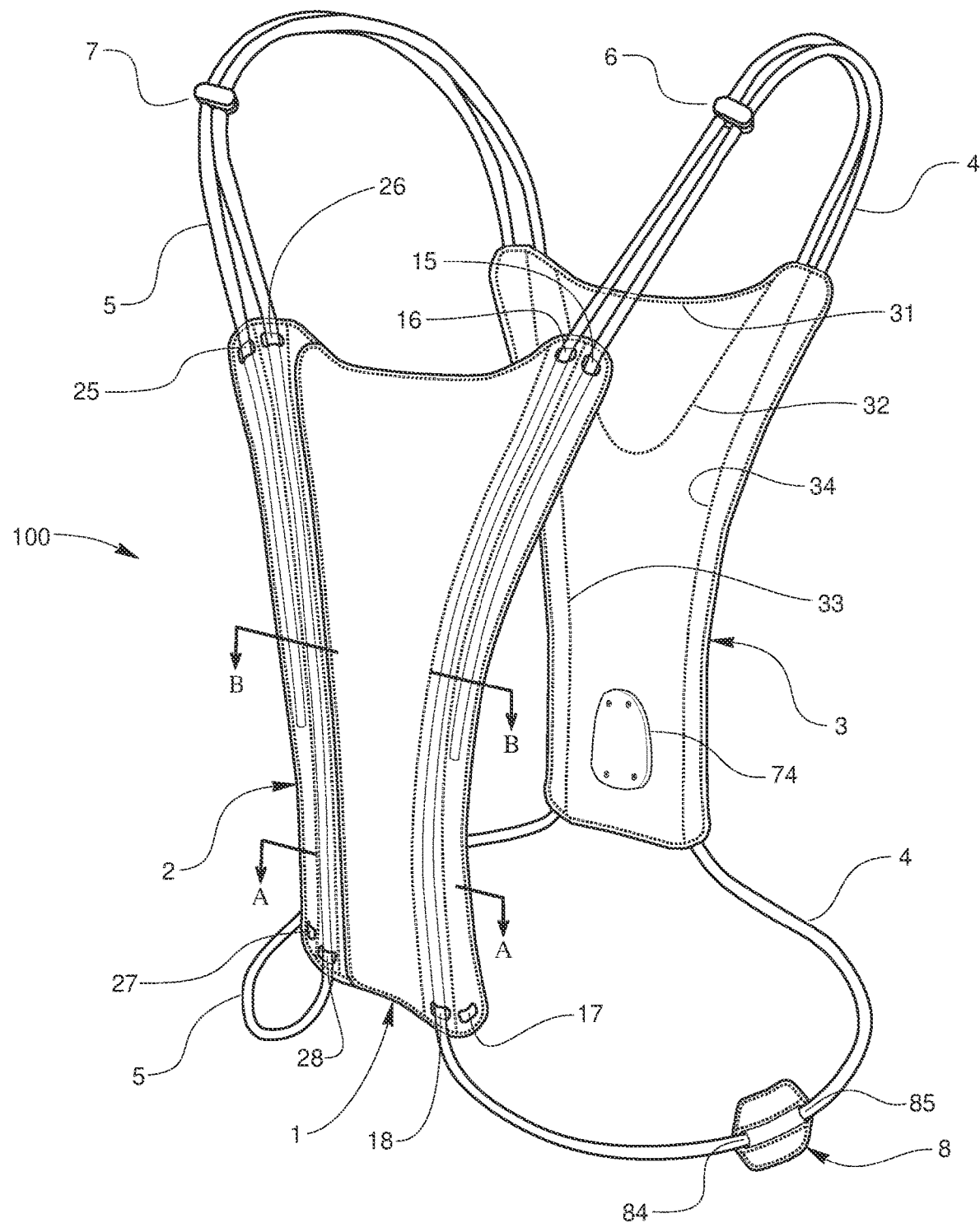
FIG. 17 is a front three-quarter perspective view of a preferred embodiment. Section lines A-A and B-B are shown.
Figure 18:
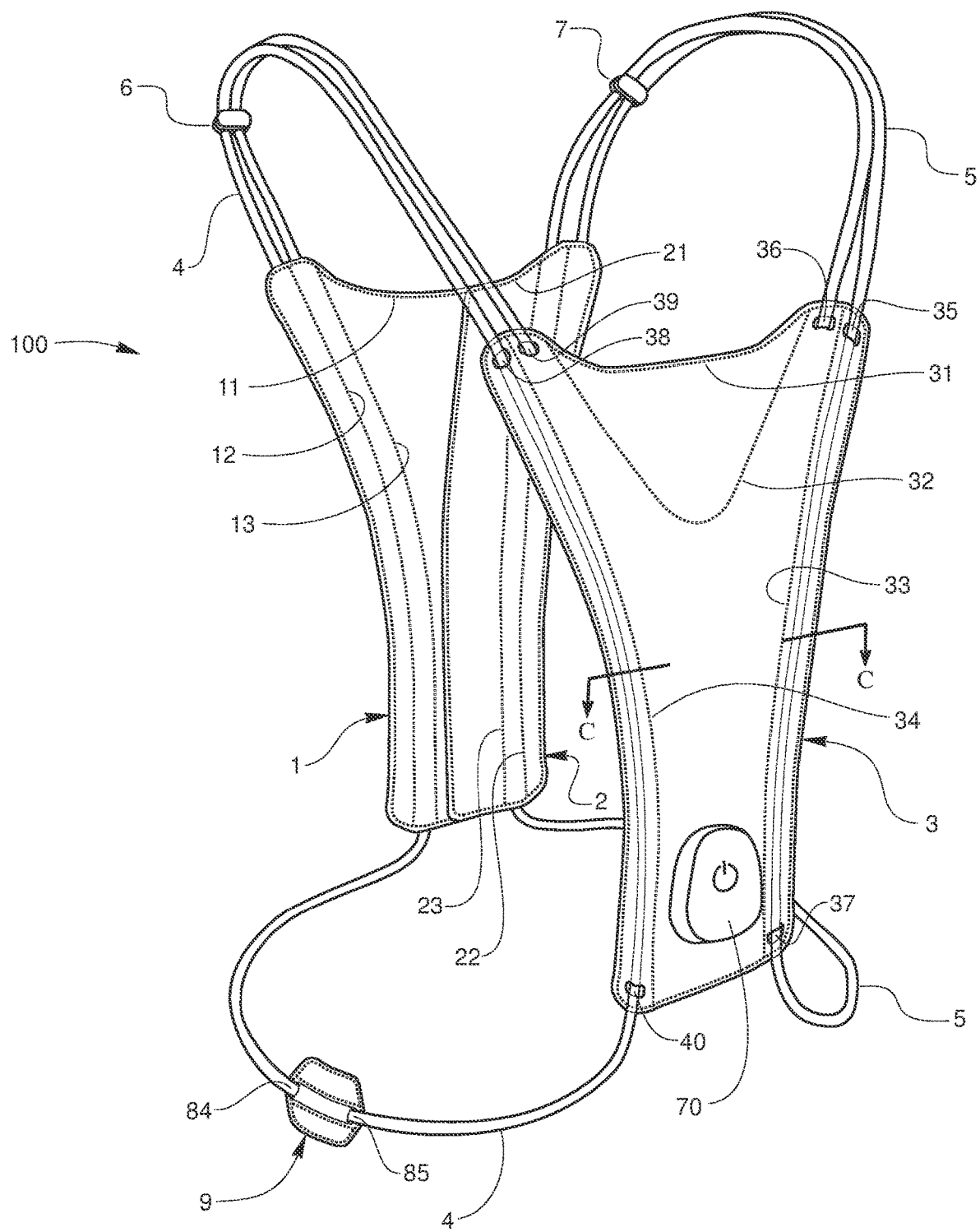
FIG. 18 is a rear three-quarter perspective view of a preferred embodiment. Section line C-C is shown.
Figure 19:
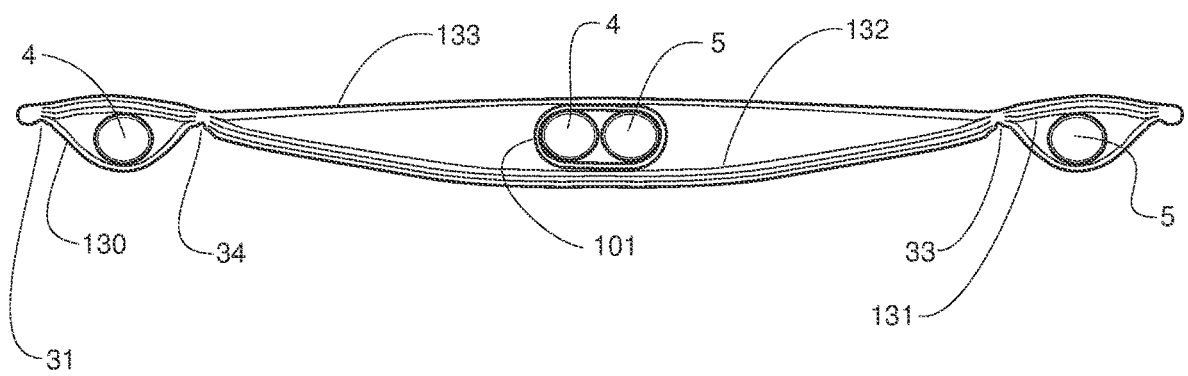
FIG. 19 is section view taken through C-C of FIG. 18.
Figure 21:
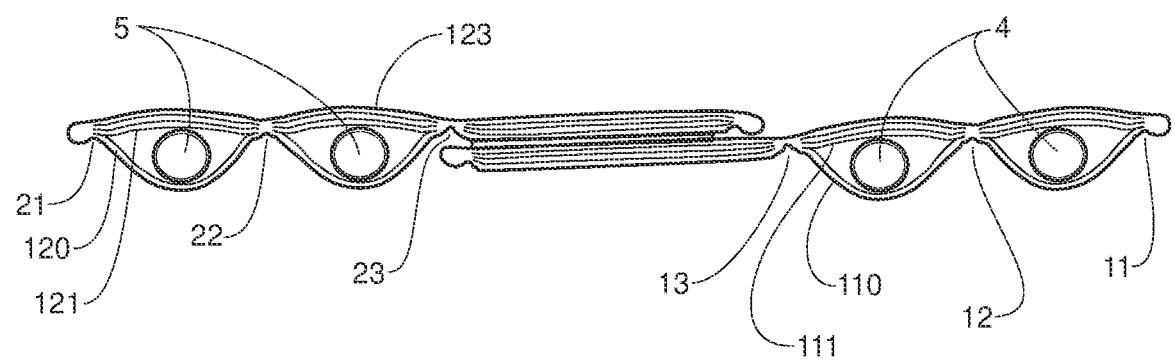
FIG. 21 is section view taken through B-B of FIG. 17.
Figure 20:
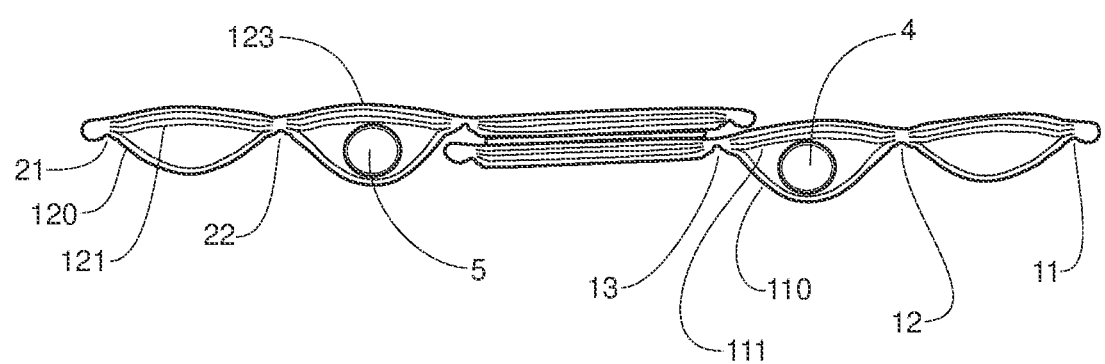
FIG. 20 is section view taken through A-A of FIG. 17.

FIG. 16 is a rear three-quarter perspective view of a preferred harness 100, with a cut-away section 40 to enable illustration of the coupling of the optic fibers to an LED light source (or sources).

Figure 22:
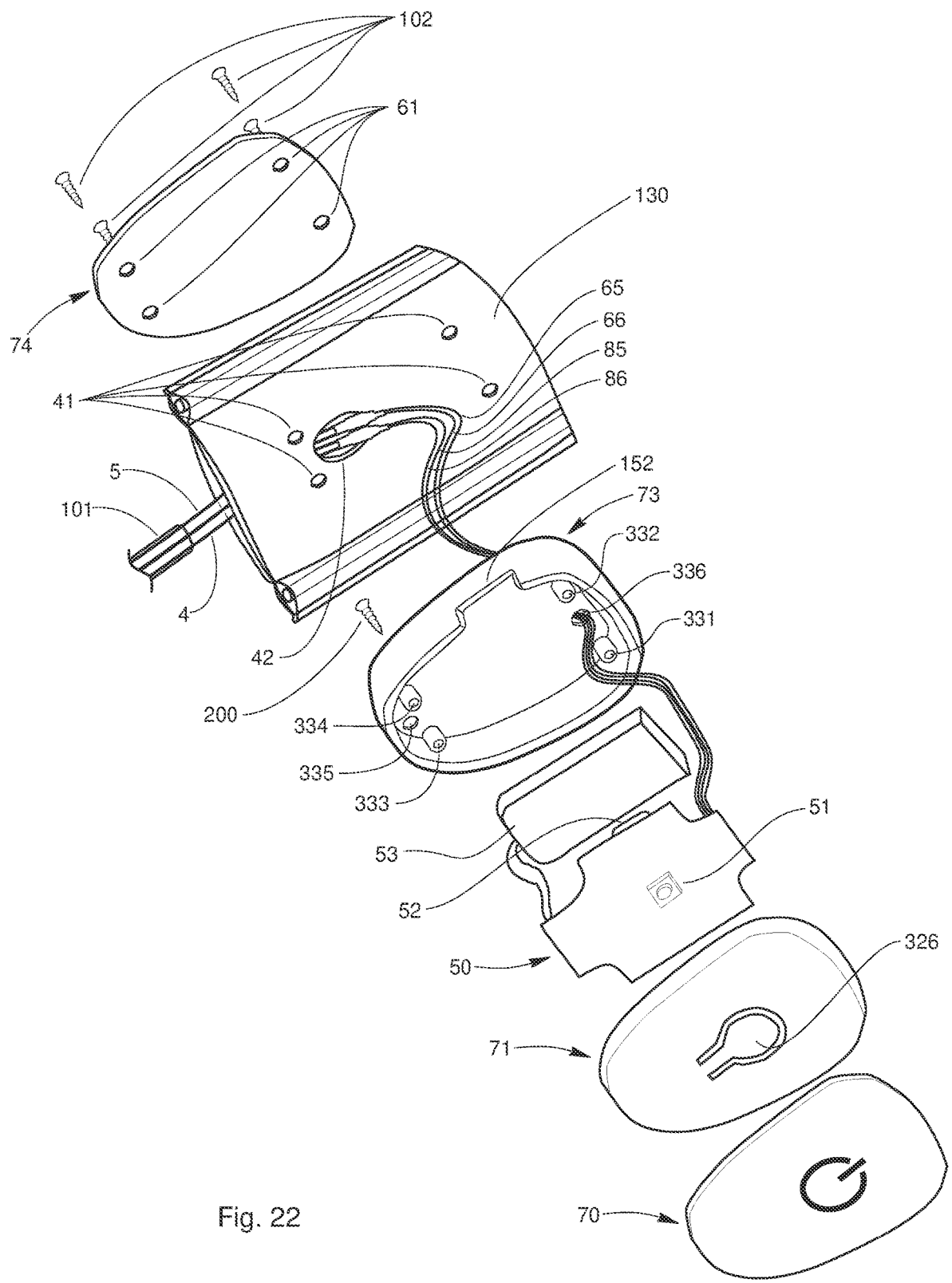
FIG. 22 is an exploded view of an electronics/battery enclosure assembly for use with a preferred embodiment.
Figure 23:
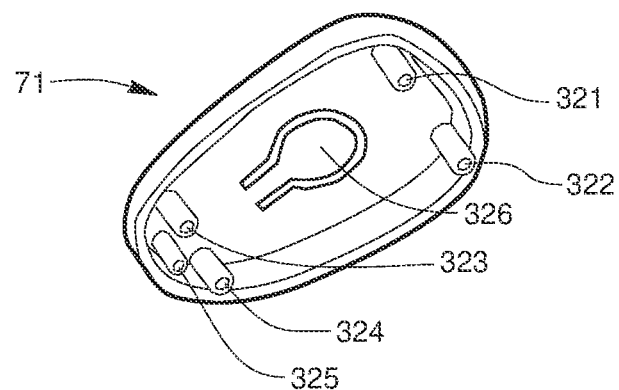
FIG. 23 is a perspective view of an enclosure cover 71, showing an interior, and in which the enclosure cover has been disassembled from the rear portion of enclosure 73.
Figure 25:
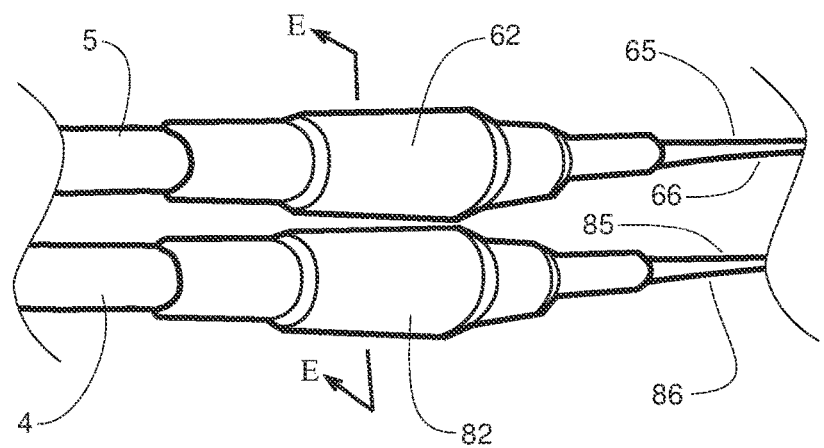
FIG. 25 is a view of optic fiber 4 and 5, showing optic fibers connected to LED light source(s). Figure is shown cut away at either end to simplify the drawing.

FIG. 22 shows an exploded view of a preferred electronics/battery enclosure assembly and mating parts. A pair of enclosure halves 71 and 73 preferably house a circuit board 50, battery 53, and other related components. The enclosure halves are held together with a screw 200, screwing through hole 335 into boss 325 (see FIG. 23) and thus LED wires 65, 66, 85, 86 (see FIG. 22, 24, 25) coming from circuit board 50 are threaded through hole 336 in one of the enclosure halves 73, threaded through a lower central hole 42 formed in the rear panel assembly 3, and specifically through layers 130, 131 and 132.

Figure 24:
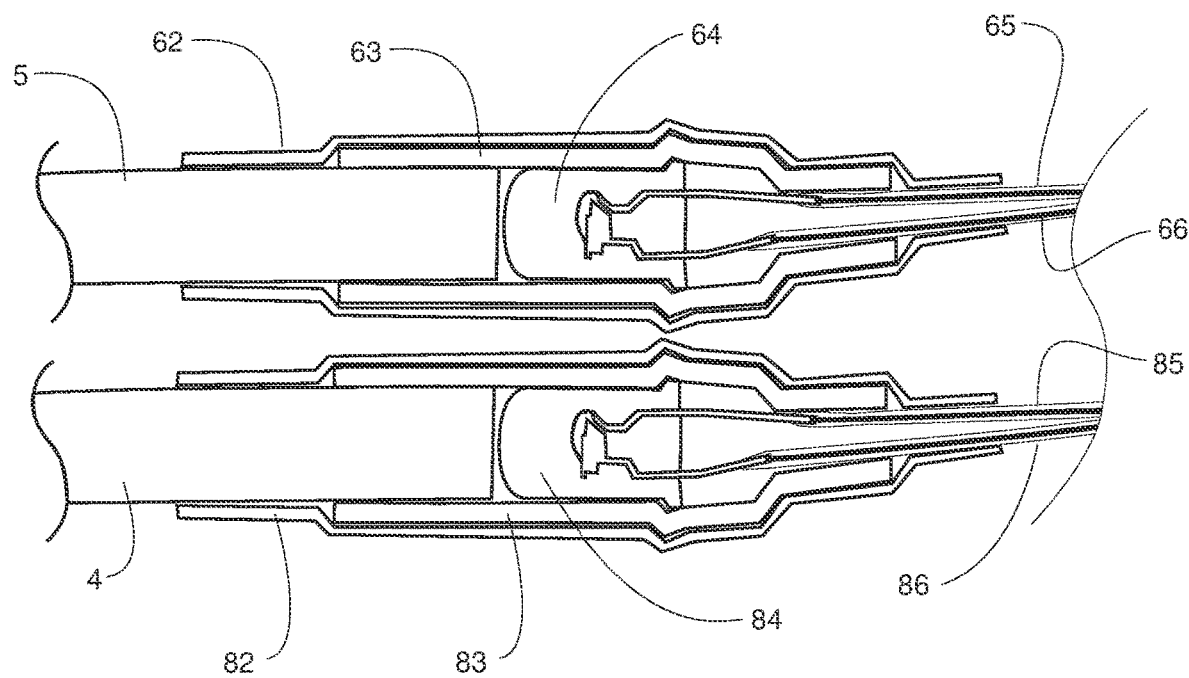
FIG. 24 is section view taken through section E-E of FIG. 25, illustrating a coupling area.

Accordingly, the wires connecting to LED elements 64 and 84 (see FIG. 24) are coupled to optic fibers 5 and 4 by means of friction sheaths 63 and 83 which are preferably plastic or the like sheath couplers that join and hold optic fibers 5 and 4 to LEDs 64 and 84. Coupling of optic fiber 5 and 4 is further held in place by lengths of heat shrink tubing 62 and 82 whereby LED elements 64 and 84 are held to shine directly into optic fibers 5 and 4.

After the optic fibers and related wires are threaded through hole 42, the assembled battery and circuit enclosure is mounted to the rear panel 3, including its layers 130, 131, 132 and 133, by screws 102 through holes 61 in a backing plate 74, and then by screwing through holes 41 in the rear panel 3, and finally through holes 331, 332, 333, and 334 in one half of the housing and then into bosses 321, 322, 323 and 324.

The electronics/battery enclosure is thus held firmly in place on the rear panel assembly 3, trapping wires 65, 66, 85, 86 in place between the backing plate 74 and the housing, preferably one of the two enclosure halves, which is enclosure half 73 as illustrated. LEDs 64 and 84 are driven by circuit 50 and battery 53 and actuated by the user by a switch 51. A flexible membrane sticker 70 is affixed to the enclosure front 71, covering a flexible cantilever 326 formed in the enclosure front, such that when a force is imparted on the sticker, and therefore the cantilever, it presses against the switch 51 to actuate the switch, thereby allowing a user to activate the LEDs, change flash modes/effects (or activate other lighting functions) that are programmed into the electronics/chips on the circuit board 50.

As can be seen in FIG. 16, with reference to the cut-away 40 formed in the rear panel 3 (through layers 130, 131 and 132) the optic fibers 4 and 5 are held together by a length of clear heat shrink tubing 101 that allows light to pass through to illuminate back panel 3 but also acts as a strain relief such that force imparted by a user on optic fibers 4 and 5 is not transferred to the coupling area of the LEDs as the tubing 101, which is firmly affixed holding fibers 4 and 5 together, stops this force because the tubing connection 101 cannot travel past the U-shaped heat seal border 32. Thus, an upward pulling force on the tubing connection 101 will cause the tubing connection to encounter the and heat seal border 32, impeding any further upward force and movement.

As can be seen in FIG. 16 and FIG. 22, Optic fiber 5 after leaving the LED coupling, travels up through the shrink tubing 101, through channel 206 between panels 132 and 133, then through hole 36 in layers 132, 131 and 130 of panel 3 wherein fiber 5 comprises the right shoulder strap of the harness 100. The second fiber 5 then travels into one side of the double-hole cord lock 7 and into the top of the right front panel 2 into hole 26, through channel 204 between layers 121 and 120, whereby when it emerges from hole 28 of layer 120 in panel 2 at the base of panel 2. The second fiber then continues into the second side reflector panel 9 (or 8 as panel 8 and 9 are identical) by threading end 105 through both holes in panel 9. In this fashion, the second optic fiber 5 comprises the right waist strap of the harness or vest 100. The second fiber 5 then travels through hole 37 in layer 130, up into channel 205 between layers 131 and 130, emerging out the top of the rear panel 3 through hole 35 in layer 130 adjacent hole 36, doubling with itself and further comprising the right shoulder strap. The second fiber 5 then travels into the other side of double-hole cord lock 7 and then down into hole 25 in layer 120 of panel 2, between panel 120 and 121 where end 105 can be retained by channel 203.

The terminal end 105 of the second fiber 5 can be fed farther through the channel between hole 25 and hole 27 if reducing the size of vest 100 is desired (that is, reducing the shoulder strap length or the waist circumference, or both). Alternatively, the terminal end 105 is fed less far through the channel (that is, it can be retracted from within the channel) defined between hole 25 and hole 27 if increasing the size of vest 100 is desired. To increase the length of the fiber loop 95 in the vest 100 to a maximum size, the terminal end 105 can be pulled out of hole 25 such that fiber end 105 is just protruding enough from hole 35 such that cord-lock 7 can retain the terminal end and can be used to hold fiber loop 95 at its maximum size adjustment. To reduce fiber loop 95 vest 100 to a minimum size, the terminal end 105 can be fed out hole 27 such that fiber end 105 is pulled completely out such that it reduces 100 vest to the minimum size. As a user desires, excess fiber can be cut with scissors if desired.

As can be seen in FIG. 16 and FIG. 22, the first optic fiber 4 after leaving LED coupling, travels up through shrink tubing 101, through channel 208 between layers 132 and 133, then through hole 39 in layers 132, 131 and 130 of panel 3, wherein the first fiber 4 comprises the left shoulder strap of the vest 100 and then travels into one side of double-hole cord lock 6. The first fiber 4 then travels into the top of panel 1 into hole 16, through channel 202 between layers 111 and 110 whereby when it emerges from hole 18 of layer 110 in panel 1 at the base of panel 1. The first fiber continues into a side reflector panel 8 (or 9 as panel 8 and 9 are identical) by threading the terminal end 104 through hole 84 through channel 209 such that it emerges out hole 85 in side panel 8, wherein the first optic fiber 4 comprises the left waist strap of the vest 100. The first fiber 4 then travels through hole 40 in layer 130 up into channel 207 between layers 131 and 130, wherein fiber 4 emerges out the top of panel 3 through hole 38 in layer 130 adjacent hole 39, doubling with itself and further comprising the left shoulder strap. The first fiber 4 continues into the other side of double-hole cord lock 6 and then down into hole 15 in layer 110 of panel 1 between layers 110 and 111 where terminal end 104 can be retained by channel 201.

The terminal end 104 of the first fiber 4 is fed farther through the channel between hole 15 and hole 17 if reducing the size of vest 100 is desired, and the terminal end 104 is fed less far through the channel between hole 15 and hole 17 if increasing the size of vest 100 is desired. To increase the size of the fiber loop 94 in the vest 100 to a maximum size, the terminal end 104 can be pulled out of hole 15 such that fiber terminal end 104 is just protruding enough from hole 38 such that cord-lock 6 can be used to hold the fiber loop 94 at its maximum size adjustment. To reduce fiber loop 94 in vest 100 to a minimum size, the terminal end 104 can be fed out hole 17 such that fiber terminal end 104 is pulled completely out such that it reduces 100 vest loop 94 to the minimum size. As a user desires, excess fiber can be cut with scissors if desired.

Optic fiber elements 4 and 5 are preferably made each of a length of preferably unwoven side-emitting optic fiber/cord wherein the optic fiber may comprise any suitable optic fiber, wherein such fiber could be coated with Polytetrafluoroethylene (PTFE) coating or other synthetic fluorine-containing polymer coating. The fiber may be made of ClearCurve® optical fiber by Corning Inc., it may have surface abrasions to control or accentuate the light emitted by the optic fiber. It is preferably flexible, durable and of a diameter that is comfortably worn against the body as well as not too thick as to be cumbersome. From 2 mm to 5 mm diameter is preferable with 3 mm diameter in many cases being an optimal diameter for the optic fiber elements 4 and 5. Material used for optic fiber elements 4 and 5 are chosen such that they allow consistent side-transmission of light wherein a desirable consistent glow can be achieved for the full length of fibers 4 and 5. Fiber optic elements 4 and 5 are preferably manufactured from clear flexible plastic or the like and are manufactured using the appropriate process such as extrusion such as to achieve the desired result. It may be desirable to introduce light-effusing material, features or other means into the plastic such as bubbles, micro-spheres, or other light-effusing means wherein light traveling down fibers 4 and 5 is effectively and consistently effused out the side of the fiber in a consistent and reliable manner such that the full length of optic fibers 4 and 5 have consistent and bright light emitted out the side of the fiber wherein there is also minimal light lost along the length of the optic fiber. The length of fibers 4 and 5 is chosen to meet the sizing requirements desired but a desirable length for each fiber is approximately 2 meters.

Cord locks 6 and 7 are coupled to the optic fiber structure. The cord locks prevent the optical fiber structure from moving lengthwise and are preferably actuated/pressed to allow a user to adjust the size of vest 100 wherein it can be seen in FIG. 1. Fiber elements 4 and 5 are adjusted by sliding elements 4 and 5 through channels 201, 202, 203, 204, 205 and 207 and affixed in place with cord locks 6 and 7. Cord locks elements are preferably chosen such they hold optical fiber in place but do not kink or damage the elements such that the light transmission is not adversely affected.

Figure 26:
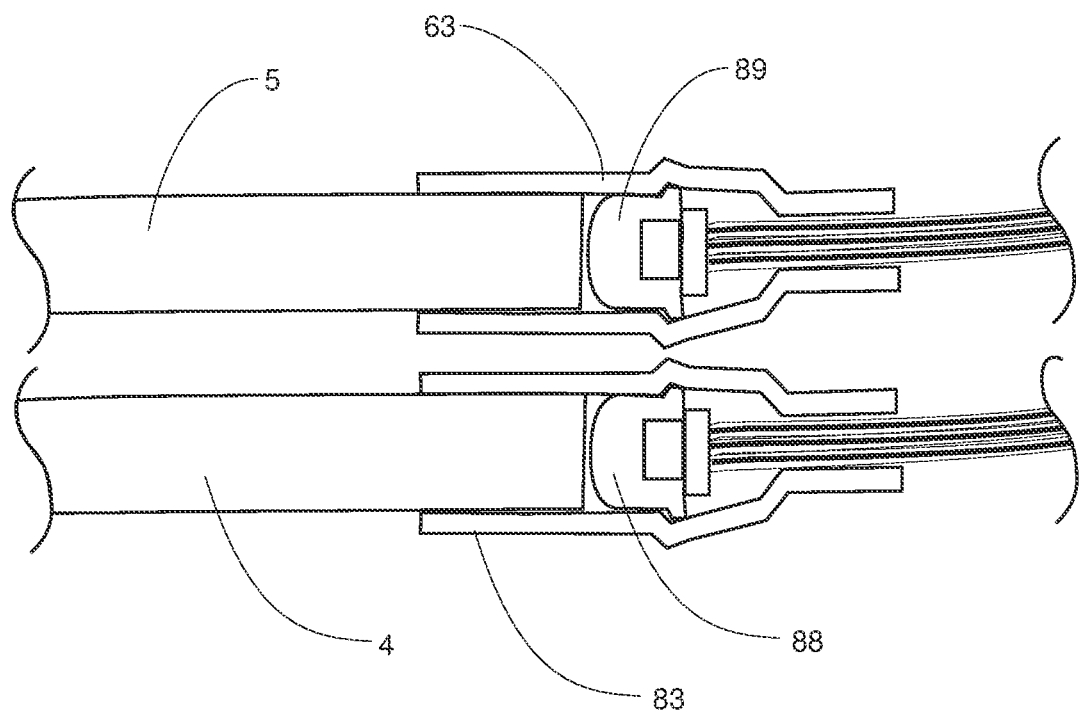
FIG. 26 is a section view taken long-ways through coupling area wherein an embodiment with a multi-color LED is shown.

It should be noted that a variety of LED lights or other type of illumination means can be applied to the ends of elements 4 and 5 to illuminate the optic fibers. FIG. 26, for example is intended to represent a multicolor LED 88 coupled with the first optic fiber 4 with a coupling sleeve element 83, and a multicolor LED 89 coupled with the second optic fiber 5 with coupling sleeve element 63, allowing for a number of different LED options to be applied and driven by appropriate electronics and programming contained within the housing to create a variety of effects, colors and lighting styles. Thus, a user can choose a desired lighting effect by pressing an actuator button 51 and further control effect as well as turn on and off the lighting elements through interaction with button 51. In some cases it may be desirable to incorporate other buttons into the electronics/battery enclosure but in many cases only one button is needed for control of the lighting features of illuminated vest 100.

The harness 100 preferably has active lighting as well as retro-reflective panels 1, 2, 3, 8 and 9 which reflect the lights of a car or other light source such that a driver of a car can not only see the light source produced by the illuminated harness but also see the retro-reflected light from the car headlights. Further because the optic fibers 4 and 5 are preferably visibly confined in channels 201, 202, 203, 204, 205 and 207, which preferably include a layer of clear material overlaying the optic fiber and a layer of retro-reflective material underlying the optic fiber, this arrangement creates a striking illumination effect wherein the light generated from the fiber appears to be amplified as it is reflected forward away from the user by the retro-reflective layer such that a user is more visible.

In some cases for panels 1, 2 and 3 it may be desirable to eliminate the clear layer such that panels are composed of only a retro-reflective layer with appropriate backing, in the case where clear layer is eliminated, the optic fibers 4 and 5 can be routed beneath the retro-reflective layer, between the retro-reflective layer and backing layer(s). It also may be desirable to add a clear layer to the side panels 8 and 9 wherein the optic fiber is routed in front of the retro-reflective layer and beneath a clear layer as is preferably the case for panels 1, 2 and 3 in channels 201, 202, 203, 204, 205 and 207 (but beneath retro-reflective layer in channels 206 and 208).

As can be seen in FIG. 16, the optic fibers 4 and 5 preferably travel up between layers 133 and 132 wherein optic fibers are preferably confined in this area by clear heat shrink tube or the like 101 wherein layer 131 as mentioned is preferably made of retro-reflective sheet material and backed with preferably white (or silver) backing 132 so that the combination of layers 131 and 132 are slightly translucent, and further layer 130 is preferably transparent such that light emitted from the optic fibers and through optic fiber strain relief/affixing tube 101 also lights up the back panel 3 such that the back panel 3 acts somewhat as a light-effusing surface such that panel 3 preferably appears to glow with light from fibers 4 and 5.

As can be seen in the figures, illuminated harness 100 preferably is user adjustable with respect to the belt and shoulder strap portions of the harness. A user can also fasten and unfasten the left and right front panels 1 and 2 via hook and loop or other fasteners, preferably integrated into the left and right panels 1 and 2. In some cases it may be desirable to use a zipper or mating magnets to affix panel 1 to panel 2, or snaps, hooks or other fasteners rather than a hook and loop configuration.

An advantage of the preferred version of the illuminated harness 100 is that it provides a discrete electronics/battery enclosure, such as illustrated in the exploded view shown in FIG. 22, wherein this enclosure can be sized easily to fit the required electronic components/battery with little manufacturing impact to the harness 100. Accordingly, for future generations this enclosure can be larger or smaller of take on whatever form is required with very minimal required changes to the configuration/design of the remainder of the harness 100, thereby minimizing manufacturing time to market and other development and design costs providing efficient means for updates to battery size/shape and other potential future electronic improvements. Further, the electronics could be incorporated in between the panel layers such that a panel layer could be used to actuate a button underneath, wherein the disclosed electronics enclosure could be eliminated and incorporated directly into or in between panels.

As mentioned, panels 110, 120 and 130 are preferably made from clear or translucent material such as TPU, PVC or the like and are preferably manufactured by cutting from sheet material and heat, ultrasonic or otherwise bonded in place although panels could be molded or otherwise formed in other versions.

FIG. 22 shows an exploded view of a preferred electronics/battery enclosure wherein the circuit board 50 connects to a rechargeable battery 53 such that a user can recharge the battery through USB or the like connector 52 which is preferably accessible through a connector port opening 152 which may include a water/dust seal cover which is not shown. Although a rechargeable battery 53 is preferred, in some cases it may desirable to use standard replaceable batteries with the appropriate connections provided within electronics/battery enclosure. It should be noted that the electronics enclosure design is flexible to allow a variety of technology; for example inductive charging elements can be incorporated, the electronics could be wi-fi enabled such that a user could program the electronics and thus the effects of the light emitted. The electronic enclosure as designed as a discrete pod-like element that allows the flexibility of just changing out this pod-like electronics/battery enclosure such that the electronics can be easily updated as desired with minimal cost and manufacturing impact. As can be understood it may be desirable to integrate a connector into the electronic/circuit board component wherein a user or in manufacturing the electronics/battery enclosure can more easily be removed from the vest and optic fiber/LED portion of the vest such that upon un-mating of the connector the optic fiber and LED portion could reside with the vest portion and the enclosure could potentially be removed such that the enclosure could be swapped out for a different one relatively easily.

Electronics/battery enclosure halves are preferably injection molded from plastic or the like as are the mentioned cord locks, and cord clips.

The invention can be constructed by integrally forming and/or otherwise fastening parts together that have been described above as having been manufactured or joined by a variety of processes and techniques. For example, various parts of the invention could be combined, molded as one, woven, heat sealed together, ultrasonically bonded together or formed in other ways.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

We claim:

1. An illuminated harness, comprising:
   a front panel assembly having a left front panel, a right front panel, and a front panel fastener operable to selectively secure the right front panel to the left front panel and to detach the right front panel from the left front panel;
   a rear panel;
   a side-illuminating fiber optic cable and a light source coupled to the fiber optic cable and being arranged to transmit light into the fiber optic cable;
   the fiber optic cable being attached to the right front panel and the left front panel, the fiber optic cable being slidably moveable with respect to both the right front panel and the left front panel for adjustment of the front panel assembly with respect to the fiber optic cable when the fiber optic cable is coupled to the light source;
   the fiber optic cable further being attached to the rear panel and being slidably moveable with respect to the rear panel for adjustment of the rear panel along the fiber optic cable when the fiber optic cable is coupled to the light source;
   the fiber optic cable, when attached to the front panel assembly and the rear panel, defining:
     a first belt portion joining the left front panel to the rear panel;
     a second belt portion joining the right front panel to the rear panel, whereby the first belt portion and the second belt portion are configured to be positioned about a waist of a user when the illuminated harness is worn by the user;
     a right shoulder strap joining the right front panel to the rear panel; and
     a left shoulder strap joining the left front panel to the rear panel, whereby the left shoulder strap and the right shoulder strap are configured to be positioned over the shoulders of the user when the illuminated harness is worn by the user and the first belt portion and the second belt portion are positioned about the waist of the user.

2. The illuminated harness of claim 1, wherein the fiber optic cable further comprises a first fiber optic cable and a second fiber optic cable, the first fiber optic cable continuously forming the first belt portion and the left shoulder strap, and the second fiber optic cable continuously forming the second belt portion and the right shoulder strap.

3. The illuminated harness of claim 2, further comprising:
a first channel and a second channel formed in the left front panel;
a third channel and a fourth channel formed in the right front panel;
the first fiber optic cable being threaded into the first channel and the second channel for slidable movement of the first fiber optic cable within the first channel and the second channel, and the second fiber optic cable being threaded into the third channel and the fourth channel for slidable movement of the second fiber optic cable within the third channel and the fourth channel.

4. The illuminated harness of claim 3, wherein the first fiber optic cable comprises a terminal end, the terminal end of the first fiber optic cable being received in the second channel.

5. The illuminated harness of claim 3, further comprising:
a first rear channel and a second rear channel formed in the rear panel;
a third rear channel and a fourth rear channel formed in the rear panel;
the first fiber optic cable being threaded into the third rear channel and the fourth rear channel for slidable movement of the first fiber optic cable within the fourth rear channel, and the second fiber optic cable being threaded into the first rear channel and the second rear channel for slidable movement of the second fiber optic cable within the first rear channel.

6. The illuminated harness of claim 3, wherein the left front panel is formed from a left front panel backing layer, a left front panel translucent layer, and a left front panel reflective layer between the left front panel backing layer and the left front panel translucent layer, and further wherein each of the first channel and the second channel are defined between the left front panel translucent layer and the left front panel reflective layer.

7. The illuminated harness of claim 6, wherein left front panel translucent layer is a transparent layer.

8. The illuminated harness of claim 6, wherein the right front panel is formed from a right front panel backing layer, a right front panel translucent layer, and a right front panel reflective layer between the right front panel backing layer and the right front panel translucent layer, and further wherein each of the third channel and the fourth channel are defined between the right front panel translucent layer and the right front panel reflective layer.

9. The illuminated harness of claim 8, wherein right front panel translucent layer is a transparent layer.

10. The illuminated harness of claim 6, wherein the rear panel is formed from a rear panel backing layer, a rear panel translucent layer, and a rear panel reflective layer between the rear panel backing layer and the rear panel translucent layer, and further wherein each of the first rear channel, the second rear channel, the third rear channel, and the fourth rear channel are defined between the rear panel translucent layer and the rear panel backing layer.

11. The illuminated harness of claim 2, further comprising:
a left side panel, the first fiber optic cable extending through the left side panel; and
a right side panel, the second fiber optic cable extending through the right side panel.

12. The illuminated harness of claim 11, wherein:
the left side panel is detached from the front panel assembly and the rear panel, and the left side panel comprises a left side panel channel, the first fiber optic cable being slideably received within the left side panel channel;
the right side panel is detached from the front panel assembly and the rear panel, and the right side panel comprises a right side panel channel, the second fiber optic cable being slideably received within the right side panel channel.

13. The illuminated harness of claim 1, further comprising a housing containing a battery providing power to the light source and having a power switch, the housing being attached to the rear panel.

14. The illuminated harness of claim 2, wherein the left shoulder strap is formed by two adjacent sections of the first fiber optic cable and the right shoulder strap is formed by two adjacent sections of the second fiber optic cable.

15. The illuminated harness of claim 2, wherein the fastener comprises a hook and loop fastener.

16. An illuminated harness, comprising:
a front panel assembly having a base, a top, a left side, and a right side, the front panel assembly further having a left front panel detachably connected to a right front panel via a fastener;
a rear panel having a base, a top, a left side, and a right side;
a side-illuminating fiber optic cable and a light source coupled to the fiber optic cable and arranged to transmit light into the fiber optic cable;
the fiber optic cable being attached to the front panel assembly such that the light from the fiber optic cable is visible between the top of the front panel assembly and the base of the front panel assembly, the fiber optic cable further being attached to the rear panel assembly such that the light from the fiber optic cable is visible between the top of the rear panel assembly and the base of the rear panel;
the fiber optic cable having:
a first belt portion joining the left front panel to the rear panel;
a second belt portion joining the right front panel to the rear panel, whereby the first belt portion and the second belt portion are configured to be positioned about a waist of a user when the illuminated harness is worn by the user;
a left shoulder strap joining the left front panel to the rear panel; and
a right shoulder strap joining the right front panel to the rear panel, whereby the first shoulder strap and the second shoulder strap are configured to be positioned over the shoulders of the user when the illuminated harness is worn by the user.

17. The illuminated harness of claim 16, wherein the fiber optic cable further comprises a first fiber optic cable and a second fiber optic cable, the first fiber optic cable continuously forming the first belt portion and the left shoulder strap, and the second fiber optic cable continuously forming the second belt portion and the right shoulder strap.

18. The illuminated harness of claim 17, wherein the first fiber optic cable extends continuously from the light source to the left shoulder strap to the first belt portion and again to the left shoulder strap, wherein the left shoulder strap is formed by two sections of the first fiber optic cable.

19. The illuminated harness of claim 18, wherein the second fiber optic cable extends continuously from the light source to the right shoulder strap to the second belt portion and again to the right shoulder strap, wherein the right shoulder strap is formed by two sections of the second fiber optic cable.

20. The illuminated harness of claim 19, further comprising:
a first channel and a second channel formed in the left front panel;
a third channel and a fourth channel formed in the right front panel;
each of the first, second, third, and fourth channels having a transparent outer layer and a reflective interior layer arranged to reflect light toward the transparent outer layer;
the first fiber optic cable being threaded into the first channel and the second channel for slidable movement of the first fiber optic cable within the first channel and the second channel, and the second fiber optic cable being threaded into the third channel and the fourth channel for slidable movement of the second fiber optic cable within the third channel and the fourth channel.

21. The illuminated harness of claim 20, further comprising:
a left side panel, the first fiber optic cable extending through the left side panel; and
a right side panel, the second fiber optic cable extending through the right side panel.

22. The illuminated harness of claim 21, wherein:
the left side panel is detached from the front panel assembly and the rear panel, and the left side panel comprises a left side panel channel, the first fiber optic cable being slideably received within the left side panel channel;
the right side panel is detached from the front panel assembly and the rear panel, and the right side panel comprises a right side panel channel, the second fiber optic cable being slideably received within the right side panel channel.

23. The illuminated harness of claim 19, wherein the light source is coupled to a power source positioned on the rear panel assembly between the first belt portion and the second belt portion, the light source further having a first light source attached to the first fiber optic cable and a second light source attached to the second fiber optic cable.

24. The illuminated harness of claim 23, further comprising:
a first rear channel and a second rear channel formed in the rear panel;
a third rear channel and a fourth rear channel formed in the rear panel;
the second rear channel and the third rear channel being separated by a U-shaped weld formed in the rear panel;
the first fiber optic cable being threaded into the third rear channel and the fourth rear channel for slidable movement of the first fiber optic cable within the fourth rear channel, and the second fiber optic cable being threaded into the first rear channel and the second rear channel for slidable movement of the second fiber optic cable within the first rear channel.

25. The illuminated harness of claim 24, wherein the first fiber optic cable is joined to the second fiber optic cable adjacent the first light source and the second light source, and further wherein the U-shaped weld is positioned to restrict movement of the joined first fiber optic cable and the second fiber optic cable.

26. The illuminated harness of claim 24, wherein the rear panel is formed form a plurality of layers, including a transparent outer layer, a reflective intermediate layer, and a backing layer.

27. The illuminated harness of claim 26, wherein the U-shaped weld joins the transparent outer layer, the reflective intermediate layer, and the backing layer.

* * * * *